United States Patent
Bohndick et al.

(10) Patent No.: US 11,834,382 B2
(45) Date of Patent: Dec. 5, 2023

(54) PEDOSPHERE-IMPROVING GRANULATE, METHOD FOR PRODUCING SAME, AND USE THEREOF

(71) Applicant: Pontes Pabuli Gmbh, Leipzig (DE)

(72) Inventors: Fred Bohndick, Leipzig (DE); Matthias Hoger, Leipzig (DE)

(73) Assignee: PONTES PABULI GMBH, Leipzig (DE)

( * ) Notice: Subject to any disclaimer, the term of this patent is extended or adjusted under 35 U.S.C. 154(b) by 409 days.

(21) Appl. No.: 16/965,371

(22) PCT Filed: Nov. 30, 2018

(86) PCT No.: PCT/EP2018/083107
§ 371 (c)(1),
(2) Date: Jul. 28, 2020

(87) PCT Pub. No.: WO2019/149405
PCT Pub. Date: Aug. 8, 2019

(65) Prior Publication Data
US 2021/0122684 A1    Apr. 29, 2021

(30) Foreign Application Priority Data

Feb. 1, 2018   (DE) .......................... 102018102226.3
Mar. 5, 2018   (DE) .......................... 102018104921.8

(51) Int. Cl.
*C05G 5/12*      (2020.01)
*C05G 5/30*      (2020.01)
(Continued)

(52) U.S. Cl.
CPC .................. *C05G 5/12* (2020.02); *B01J 2/16* (2013.01); *C05B 7/00* (2013.01); *C05B 19/00* (2013.01);
(Continued)

(58) Field of Classification Search
None
See application file for complete search history.

(56) References Cited

U.S. PATENT DOCUMENTS 5,279,637 A * 1/1994 Lynam ................. F26B 25/005
165/92
6,027,543 A * 2/2000 Yoshizaki ............... C02F 11/18
588/407

(Continued)

FOREIGN PATENT DOCUMENTS

CN   102476961 A   5/2012
CN   105772484 A   7/2016
(Continued)

OTHER PUBLICATIONS

Int'l. Search Report for PCT/EP2018/083107, dated Feb. 21, 2019.

*Primary Examiner* — Wayne A Langel
(74) *Attorney, Agent, or Firm* — MaxGoLaw PLLC

(57) ABSTRACT

A method for producing a pedosphere-improving granulate (6) and granulate itself, the method includes a) producing a raw material dispersion including at least one inorganic secondary phosphate (1) and at least one reaction agent (2) in a liquid phase (4), b) separating part of the liquid phase (4) from the raw material dispersion, c) granulating and/or extruding the remaining raw material dispersion with a reduced liquid phase (4), d) either returning the liquid phase (4) separated in process step b) to process step a) in order to produce a raw material dispersion without at least partly separating (5) heavy metals or at least partly separating heavy metals (7) from the liquid phase (4) separated in process step b) and discharging the heavy metals (7) out of the process in a manner analogous to process step a) and/or returning the liquid phase to process step c), and e) repeating process steps a) to d).

11 Claims, 2 Drawing Sheets

Figure 1:
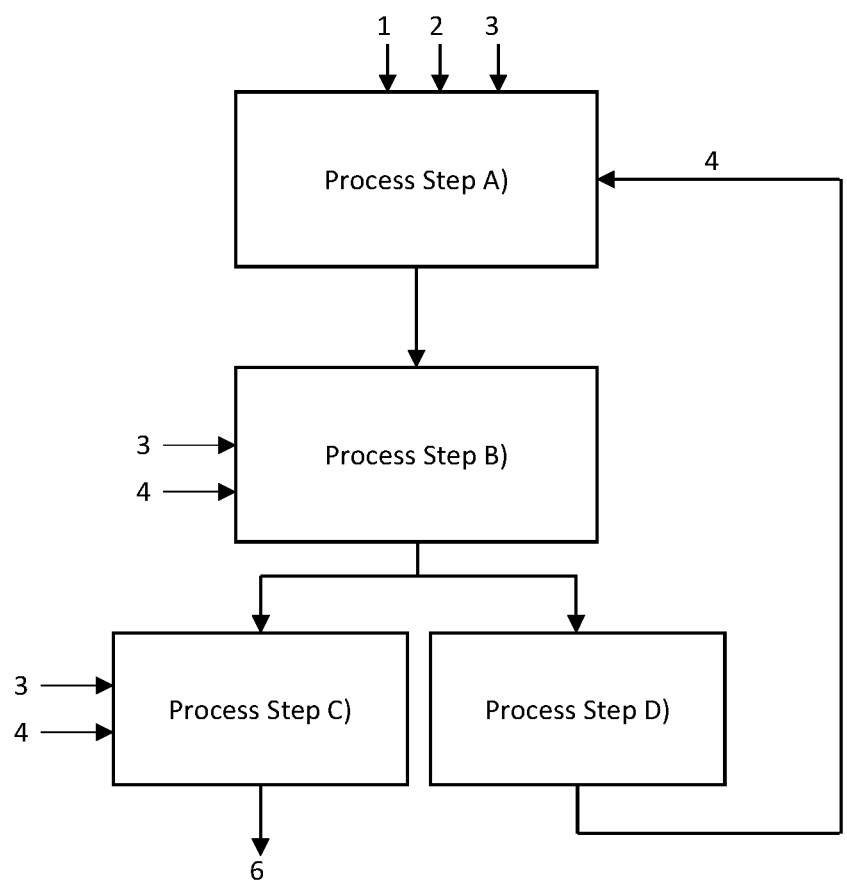

(51) Int. Cl.
*C05G 1/00* (2006.01)
*B01J 2/16* (2006.01)
*C05B 7/00* (2006.01)
*C05B 19/00* (2006.01)
*C05F 11/02* (2006.01)
*C05F 7/00* (2006.01)

(52) U.S. Cl.
CPC ............... *C05F 11/02* (2013.01); *C05G 1/00* (2013.01); *C05G 5/30* (2020.02); *C05F 7/005* (2013.01)

(56) References Cited

U.S. PATENT DOCUMENTS

| | | | |
|---|---|---|---|
| 10,259,752 B2 | 4/2019 | Stemann et al. | |
| 2008/0098782 A1* | 5/2008 | Urano | C05F 3/00 71/21 |
| 2009/0314046 A1* | 12/2009 | Rieth | C05D 9/00 71/12 |
| 2012/0070360 A1* | 3/2012 | Wissemborski | B01D 11/0203 423/304 |
| 2015/0128672 A1* | 5/2015 | Shearer | C05G 3/00 71/24 |
| 2016/0060113 A1* | 3/2016 | Cohen | C01G 49/02 422/187 |
| 2016/0130191 A1 | 5/2016 | Clark et al. | |
| 2016/0257574 A1* | 9/2016 | Lehmkuhl | C01B 25/36 |
| 2017/0050848 A1* | 2/2017 | Lehmkuhl | C05B 1/04 |
| 2019/0002321 A1* | 1/2019 | Grönfors | C02F 9/00 |
| 2019/0284106 A1* | 9/2019 | Grönfors | C02F 1/5245 |

FOREIGN PATENT DOCUMENTS

| | | | | |
|---|---|---|---|---|
| CN | 106518483 A | | 3/2017 | |
| DE | 10206347 A1 | | 9/2003 | |
| DE | 102013103770 A1 | * | 10/2014 | ............ C05B 7/00 |
| DE | 102014108199 B3 | | 5/2015 | |
| DE | 102016112300 A1 | | 1/2018 | |
| EP | 2602013 | * | 12/2013 | ............ B01D 11/02 |
| EP | 3037396 A1 | | 6/2016 | |
| EP | 3293165 A1 | | 3/2018 | |
| WO | 2011137880 A1 | | 11/2011 | |
| WO | WO 2013/002250 A1 | * | 1/2013 | ............ C05F 17/50 |
| WO | WO 2017/194843 A1 | * | 11/2017 | ............ C05C 9/00 |

* cited by examiner

PEDOSPHERE-IMPROVING GRANULATE, METHOD FOR PRODUCING SAME, AND USE THEREOF

FIELD OF THE INVENTION

The invention relates to a pedosphere-improving granulate, a production process therefor, and a coated or uncoated fertilizer granulate which can be used to supply nutrients in agriculture, forestry and/or horticulture.

DESCRIPTION

The invention relates to a method for producing a pedosphere-improving granulate (6) in a) producing a raw material dispersion comprising at least one inorganic secondary phosphate (I) and at least one reactant (2), the proportion of which is a liquid Phase (4) in the raw material dispersion is greater than 30%, with an incubation time between inorganic secondary phosphate (I) and reactant (2) between 1 to 100 minutes, b) separation of part of the liquid phase (4) of the raw material dispersion, c) granulation and/or extrusion of the remaining raw material dispersion with reduced liquid phase (4), d) either recycling the liquid phase (4) separated in process step b) without at least partially separating heavy metals (5) into process step a) to produce a raw material dispersion or at least partially separating heavy metals (7) from the liquid phase (4) separated in process step b) and discharge of these heavy metals (7) from the process with subsequent recycling of the low-heavy metal liquid phase (4) to produce a raw material dispersion analogous to process step a) and/or in process steps c) and e) repeating process steps a) to d). The invention also relates to granules (6) which improve the pedo-spheres and can be produced using this method, and to coated or uncoated fertilizer granules which can be used to supply nutrients in agriculture, forestry and/or horticulture.

STATE OF THE ART

Agricultural use removes mineral raw materials, such as phosphorus-containing compounds, from the soil, which have to be compensated for by the subsequent addition of mineral fertilizers. With the material and energetic use of biomass, such as from household waste or sewage sludge, there is a removal of nutrients and considerable amounts of organic matter from the natural material cycles. The preservation of the fertility of the soil through the use of artificial mineral fertilizers from fossil resources is to be assessed ecologically critically, on the one hand due to the environmentally destructive degradation and on the other hand due to the heavy metal input to the soil by mineral fertilizers. Phosphorus is a limited raw material and its efficient use for fertile soil against the background of a growing world population is of great importance. From the point of view of sustainability, the closing of natural nutrient cycles is increasingly coming to the fore, and also offers a local raw material source that has so far been used only to a limited extent to date.

Organic residues such as clear sludge, garbage or guile basically are a cost-effective and sustainable alternative to mineral fertilizers and thus to close the nutrient cycle. Some of these residues are still applied directly to fields. However, for some time now acceptance of this recycling path progressively decreases progressively because the direct application leads to undesirable odor pollution and these connected cycles are suspected are suspected of leading to an undesirable concentration of certain pollutants, such as perfluorinated surfactants (PFT) and different heavy metals. Sewage sludge that has not been subjected to hygienic treatment may also contain a variety of epidemic and phytohygienic relevant pathogens, such as bacteria, viruses, parasites, and worm eggs. If organic residues are to be utilized in agriculture, there is a fundamental risk that pathogens will reach humans and animals via food and feed and endanger them.

Currently, the thermal utilization of these organic residues continues to gain in importance. Ashes from thermal recycling and/or incineration of organic residues are due to the high content of nutrients such as phosphorus (P), suitable raw material sources. However, the heavy metals become concentrated/accumulated. Due to the poor availability of plants, phosphorus (P) contained in the ashes as well as the pollutant content virtually prohibits direct use of ashes as a fertilizer. As a result, such ashes are currently mostly landfilled or used in landscaping and are thus no longer available to the material cycles as a source of raw materials.

The prior art discloses various processes for the recycling of phosphorus-containing ashes, for example from sewage sludge. The known methods are based on the raw material ash, wherein the P content in the ashes should be as high as possible. The processes differ with regards to P deposition (acid and precipitant), the recycling product and the type of heavy metal separation. The processes for recovering phosphate from sewage sludge can generally be subdivided into thermochemical, thermoelectric and wet chemical approaches, whereas the thermochemical processes are usually being carried out below the ash melting point <1000° C., and the wet chemical processes above the melting point of ash >1 000° C.

Thermochemical or thermoelectric processes basically use high temperatures to bring volatile heavy metals (such as As, Cd, Hg and Zn) into the gas phase, if or appropriate possibly with the support of an alkali salt or chlorine gas, and to deposit them in this way. The thermochemical or thermoelectric processes are relatively energy-intensive and require a complex technology and a high level of security for safe handling. The solubility of the phosphates in the resulting heavy metal contaminated ash corresponds to a conventional sewage sludge ash and is therefore not suitable as a fertilizer without further treatment. The chemical and mineralogical composition of the discharged ash corresponds largely to the sewage sludge or sewage sludge ash used. Thus, the nutrient composition does not correspond to the required soil and plant-specific nutrient needs. The typical fluctuations in sewage sludge or sewage sludge ash are not compensated in the process, so that the quality of the product varies considerably. Marketability of such products can at least be classified as very difficult.

Many different concepts are used in the wet-chemical processes, distinguishing generally between processes in which the acid is mixed only with the ashes and from which fertilizers are produced, and processes in which phosphorus is extracted from the ash and thus brought into the liquid phase.

The wet chemical process, in which basically only earth-moist ash is mixed with acid in particular to produce fertilizers is economical and also technically manageable.

The largely insoluble phosphate from phosphate-containing ashes is digested with mineral acid. Such a method is known for example from DE 10 2010 034 042 B4. The process produces a phosphate or multi-nutrient fertilizer by mixing ash from sewage sludge mono-combustion with mineral acid with the addition of potassium and/or nitrogen carriers. The mineral acid includes the sparingly soluble phosphate compounds in the sewage sludge ash. The desired conversion reactions and the granulation occur largely simultaneously. The mixture, the reaction and the granulation take place in a mixing apparatus. Ploughshare mixers with a knife set, a continuous flow mixer or a twin-shaft paddle mixer are proposed. In this type of wet-chemical process, as described for example in DE 10 2010 034 042, the resulting nutrient composition is adaptable to the soil and plant needs. However, in these processes, the heavy metals are not separated from the ashes but end up completely in the fertilizer and thus into the nutrient cycle.

Accordingly, there is currently no legal clarity about whether only such ashes may be used in such processes already comply with the Ordinance on Food Resources. In addition, these methods have considerable procedural problems in the technical implementation, since when mixing the phosphate-containing ashes with the mineral acid take place spontaneously sometimes very exothermic reactions take place, that significant interferences with the simultaneous granulation. In addition, the mixture of ash with acid is often particularly sticky, which makes stable process management significantly more difficult and often leads to process disruptions through adherence and clogging of system parts. Another problem is that mineral acids are very corrosive and, in this process, many plant components, for example the granulation unit, drying unit or connecting sections, come into contact with it and are damaged accordingly.

With other wet chemical processes, such as BioCon, SEPHOS, SESALPhos, Tetraphos, PASCH or Leachphos processes, at least the heavy metals can partially be separated, however considerable process residues accrue.

Thus, for example, methods are known in which phosphoric acid is obtained from combustion ash by digestion with mineral acids, wherein heavy metals are removed from the digestion solution or from the phosphoric acid produced by use of ion exchange resins. An example of this is WO 00/50343. In this method, the combustion ash is digested with sulfuric acid. This produced phosphoric acid, which was separated from the insoluble residue (process residue) and is still heavily contaminated with iron and heavy metals. To clean the phosphoric acid, a combination of ion exchange filters is used in this process. In particular, a strongly acidic cation exchange is used to remove iron and heavy metal ions.

CH 697083 describes a process for the recovery of phosphorus from phosphorus-containing combustion ashes, in which the phosphate contained in the combustion ash are brought into solution by acid digestion. The solution separated from the insoluble residue (process residue) is separated by a liquid-liquid extraction is cleaned and iron is removed in particular. Preferably it is cleaned with an organic extractant. From that of iron and other heavy metals purified raffinate calcium phosphates are precipitated.

DE 102 06 347 describes a process for the production of phosphorus compounds from combustion residues, in which dilute mineral acids are added to the combustion ash to dissolve phosphate compounds contained therein and then the insoluble accompanying components (process residue) are separated. From the resulting phosphate solution, the heavy metals are precipitated selectively by pH adjustment. The purified phosphate-containing solution is further processed or the phosphate is precipitated therefrom.

EP 2 602 013 A1 describes a process for the recovery of phosphorus compounds from secondary raw materials containing phosphorus, in which process the phosphorus-containing compounds contained in the secondary raw materials containing phosphate are brought into solution in a decomposition vessel by acid digestion with a dilute mineral acid, and by filtration a filter cake (process residue) is separated from the filtrate, the filtrate having a pH of 0 to 1.

During or immediately after the acid digestion or in a separate container to the filtrate after the filter cake has been separated off, a sacrificial metal is added in order to reduce heavy metal cations. The resulting metallic heavy metals being separated off by filtration together with the filter cake or separately. Then an aluminum salt is added and the pH is raised with a base to a range from pH 2.1 to 3.0 and the precipitated product is separated. The precipitated phosphorus product, i.e. the aluminum phosphate, can now be fed into either the fertilizer production or the thermal phosphorus production. An aluminum phosphate is created, which is first processed into a soil- and plant-specific fertilizer.

From the prior art [J. Pinnekamp, Phosphorous Recycling-Ecological and economic evaluation of various processes and development of a strategic utilization concept for Germany, 2011.] a phosphorus recovery process from sewage sludge ashes called SEASAL is also known. The process is based on an eight-hour elution of the sewage sludge ash with hydrochloric acid (HCl), whereby there is a redissolution of calcium, magnesium, potassium and heavy metals. Phosphorus is only re-dissolved in small proportions; rather, the calcium phosphates are largely converted into aluminum phosphates. Calcium and aluminum phosphates are both poorly available to plants and therefore cannot be used as fertilizers. The ash remaining after a solid/liquid separation is also eluted at pH 13 in a further treatment step for 8 hours. Phosphorus and aluminum go into solution, and after the ash has been separated, calcium chloride is added and calcium phosphate obtained. The disadvantage of this method is that the treatment steps are very time-consuming. The phosphate phase conversion process with acid takes about 8 hours, which requires a very large system size. In addition, the process requires considerable use of acids, alkalis and excipients. An acid treatment is carried out first, then elution is carried out at pH 13 and the filtrate obtained is then precipitated with $CaCl_2$. There are also significant amounts of waste. The phosphate is only released from the ashes and large parts of the ashes remain as waste.

Furthermore, from the prior art [L. Hermann, "Recovery of phosphorus from wastewater treatment", published by the Federal Office for the Environment FOEN, Bern, 2009] a so-called SEPHOS Phosphorous Recycling Method be known. In this process, the aluminum or iron-containing ash is mixed with sulfuric acid and brought to a pH of about pH 1.5. The phosphorus is thus almost completely re-dissolved from the ash. In a next step, the separation of the liquid phase takes place. The filtrate is gradually raised with sodium hydroxide solution to a pH of about 3-4 and aluminum phosphate falls out. Disadvantage of this process is that the phosphate is released from the ashes and separated from the insoluble as residue. This insoluble ash residue is a waste that has to be disposed of expensively. Up to this stage of the process also offers no way to separate heavy metals. Only in the possible further development stage of this process is there a possibility to do so. For this purpose, the precipitation product (Sephos product=$AlPO_4$) is raised to a pH of 12-14 with an alkaline leaching agent so that aluminum and phosphorus dissolve. The heavy metal contaminants of the aluminum phosphate are not re-dissolved under these conditions and remain in the residual precipitated sludge. The sludge/water mixture is centrifuged and the heavy metals are thus separated. Calcium is added to the filtrate so that calcium phosphate precipitates. However, this basic possibility of separating heavy metals is complex and requires a particularly high use of chemicals.

A common feature of all these processes is that by mixing the sewage sludge ash with mineral acid, depending on the type and concentration of the mineral acid and depending on the process control, a large part of the phosphate of the ash is dissolved, but a significant proportion of undissolved components remains. These undissolved components are process residues that have to be disposed of at great expense, although they still contain nutrient components. On the other hand, it is advantageous in these processes that the phosphate-containing solution obtained is at least partially freed from heavy metals and these heavy metals are removed from the process. However, in these processes, the phosphate-containing solution is then very complex and further processed by very complex precipitation or extraction processes. The cost driver is the considerable use of additional chemicals. Frequently, products are created that cannot be used directly as fertilizers, for example, but must then be processed again.

EP 3 037 396 A1 discloses a method for producing a phosphate-containing fertilizer from an ash or a carbonization residue of a sludge from waste water treatment or waste fermentation. Here, an ash or the charring residue is mixed with a mineral acid and the resulting suspension is kept in a first vessel, after which wet solids are separated from the suspension and the separated solids are replaced by further ash or further charring residue, the charring mix the further ash or the further charring residue with the mineral acid remaining in the first vessel and incubate the resulting suspension in the first vessel. The separated solid is transferred to a second vessel and mixed there with a pH-neutral, basic or buffered aqueous liquid, then part of the liquid resulting from the mixing is separated from the second vessel, the heavy metal ions contained therein are separated from it and this liquid is returned into the second vessel. In EP 3 037 396 A1, a moist solid is thus separated off in process step 2, the solution remaining in vessel 1. New ash is added to the remaining liquid in vessel 1. Accordingly, no further acid is added as a reactant in the subsequent batch. This reduces the acid strength from batch to batch and thus the dissolving or conversion potential of the acid compared to the phosphate. A disadvantage of this method is that the phosphate solubility of the ash is increased in the first batch at most, with each subsequent batch the solubility decreases until there is ultimately no change compared to the source ash.

Furthermore, pedosphere-improving granules are described in the prior art, but these often have a disadvantageous effect. Although many of these known structures have a positive effect on plant growth, but this is associated with negative effects on microorganisms and microorganisms. It has been observed several times that, for example, the number of earthworms decreases due to granules of the prior art and fewer nitrogen-assimilating microorganisms still occur in the soil. While the reduction of such soil organisms was considered to be of little relevance in the past, we now know that the organisms mentioned are central to the quality of the soil. In particular, soils that are exposed to strongly changing weather conditions, such as high temperatures or heavy rain, require healthy biomass, such as insects, nematodes or annelids, to ensure high yields in plants even in strongly fluctuating weather conditions.

It is therefore an object of the invention to provide new and improved granules which optimize the pedosphere with respect to soil flora and fauna. Soil flora mainly includes plant or non-animal organisms, e.g. bacteria, radiation mushrooms, fungi, algae and lichen. The soil fauna is composed of animal unicellular organisms and multicellular organisms, which are differentiated according to their size into micro fauna (<0.2 mm; e.g. eyelash animals, flagella, amoeba, small nematodes), mesofauna (<2 mm; e.g. springtails, rotifers, mites), macro fauna (>2 mm; e.g. bristle worms, woodlice, insects) and megafauna (>20 mm; e.g. vertebrates such as voles, shrews, moles). The optimization primarily affects the improved plant growth as well as the growth of bacteria, flagellates, roundworms, annelids or insects and others.

The present invention is also based on the object to provide an economical, ecological, flexible, simple and technically feasible process for the production of soil and/or plant-specific fertilizers with precisely adjustable nutrient composition in granular form. The inventive method a variety of inorganic secondary phosphates can be processed efficiently and inexpensive, with targeted soil and plant specific fertilizer compositions are to be provided. In the resulting fertilizer granules much of the phosphate should be in a good plant available form and at least a part the heavy metals is separated. In addition, a fertilizer is to be provided which can be used and/or used in agriculture, forestry or horticulture as pedoshere-improver.

DESCRIPTION OF THE INVENTION

The problem is solved by the features of the independent claims. Advantageous embodiments of the invention are described in the dependent claims. According to the invention, a pedosphere-improving granulate is provided which is produced using a method which comprises the following steps:

a) Production of a raw material dispersion comprising at least one inorganic secondary phosphate and at least one reactant, the proportion of a liquid phase in the raw material dispersion being greater than 30%, with an incubation time between inorganic secondary phosphate and reactant of between 1 and 100 minutes, b) Separation of part of the liquid phase of the raw material dispersion, c) Granulation and/or extrusion of the remaining raw material dispersion with reduced liquid phase, d) Either recycling the liquid phase separated in process step b) without at least partially separating heavy metals into process step a) to produce a raw material dispersion or at least partially separating heavy metals from the liquid phase separated in process step b) and discharging these heavy metals from the process with subsequent recycling of the separated low-heavy liquid phase to produce a raw material dispersion analogous to process step a) and/or in process step c) and e) repeating process steps a) to d).

In a further aspect, the invention relates to a method for producing a pedosphere-improving granulate, which comprises said process steps a) to e). All percentages (%) in the context of the invention relate to percent by weight (% by weight i.e. % w/w), unless stated otherwise. A particular advantage of the proposed granulate and the proposed method is that the neutral ammonium citrate solubility of the phosphate supplied with the inorganic secondary phosphate is increased by reaction with the at least one reactant and the $P_2O_5$ content from the inorganic secondary phosphate in the fertilizer granulate is greater than 60% neutral. is soluble in ammonium citrate. In the context of the invention, the term "$P_2O_5$ fraction" preferably describes the proportion of $P_2O_5$ in the fertilizer granulate.

In a very particularly preferred embodiment, the invention relates to a pedosphere-improving granulate which can be produced by a process comprising the following steps:
a) Production of a raw material dispersion from at least one inorganic secondary phosphate and at least one reactant, the proportion of liquid phase in the raw material dispersion being greater than 30%, and incubation time between inorganic secondary phosphate and reactant between 1 to 100 minutes,
b) Separation of part of the liquid phase of the raw material dispersion produced under a),
c) Granulation and/or extrusion of the remaining raw material dispersion with reduced liquid phase from process step b),
d) Either recycling the liquid phase separated in process step b) without at least partially separating heavy metals into process step a) to produce a raw material dispersion or at least partially separating heavy metals from the liquid phase separated in process step b) and discharging these heavy metals from the process with subsequent recycling of the separated low-heavy liquid phase to produce a raw material dispersion analogous to process step a) and/or to process step c) and
e) Repeating process steps a) to d),
wherein the neutral ammonium citrate solubility of the phosphate supplied with the inorganic secondary phosphate is increased by reaction with at least one reactant and the $P_2O_5$ fraction from the inorganic secondary phosphate in the fertilizer granules is greater than 60% neutral ammonium citrate soluble.

Granules used to improve individual soil layers are difficult to characterize using chemical formulas or biophysical data. For this reason, the pedosphere-improving granules in the meaning of the invention are preferably characterized by the process for their preparation. This is permissible because the pedosphere-improving granules are difficult to define differently from the manufacturing process. The granules proposed preferably comprise several nutrient sources. According to the invention, one of these nutrient sources is inorganic secondary phosphate, as occurs, for example, in sewage sludge ash. This secondary phosphate is made available by the action of a reactant. The heavy metals contained in the inorganic secondary phosphate can at least partially be separated off, with no further residues being produced apart from the separated and discharged heavy metals. A wide variety of inorganic secondary phosphates can be processed efficiently and inexpensively by the proposed method and the proposed device, the typical fluctuation range of the secondary raw materials being able to be compensated for by flexibly usable further nutrient components. This makes it possible to provide soil- and/or plant-specific fertilizer compositions in a targeted manner, a large proportion of the phosphate being present in a form readily available to plants in the resulting fertilizer granules and at least some of the heavy metals can be separated.

A further advantage of the invention is that inorganic secondary phosphate, such as sewage sludge ash, can be used as a source of nutrients and can thus be put to a meaningful use, the phosphate contained therein being made particularly available to plants. In addition, the invention makes it with light possible to at least partially separate the heavy metals contained in the inorganic secondary phosphate. Tests have shown that, surprisingly, in addition to the separated and discharged heavy metals, no further residues result from the process.

It is preferred for the purposes of the invention that the raw material dispersion is adjusted before the partial separation of the liquid phase in such a way that the solids content is less than 50%. In other words, it is preferred for the purposes of the invention that in the proposed method the solids content within the raw material dispersion is less than 50%. In the sense of the invention, it is also preferred for the purposes of the invention that a pH value of the raw material dispersion produced before the partial separation of the liquid phase is in a range between 1.5 to 3.5. Furthermore, the at least partial separation of heavy metals from the liquid phase separated in process step b) can take place by one or more precipitation reactions and subsequent separation of the precipitated products. In other words, it is preferred in the sense of the invention that the pH of the raw material dispersion produced before the partial separation of the liquid phase in process step b) is in the range 1.5 to 3.5 or is set and the at least partial separation heavy metals can be removed from the liquid phase separated in process step b) by one or more precipitation reactions and subsequent separation of the precipitation products.

The pH of the raw material dispersion produced is preferably less than 2 before and during the partial separation of the liquid phase. It is also preferred that at least partial separation of heavy metals from the liquid phase separated in process step b) by one or more selective separations processes. It is therefore particularly preferred in the sense of the invention that the pH of the raw material dispersion produced before and during the partial separation of the liquid phase in process step b) is less than 2 and the at least partial separation of heavy metals from the liquid separated in process step b) Phase can be done by one or more selective separation processes.

In a preferred embodiment of the invention, the raw material dispersion with reduced liquid phase from process step b) has a moisture content between 10 and 40%. In the sense of the invention, it is also preferred that the pH of the raw material dispersion with reduced liquid phase is in a range of 4-8. It is furthermore particularly preferred in the sense of the invention that the raw material dispersion with reduced liquid phase from process step b) contains a moisture content of 10 to less than 40%, the pH of this raw material dispersion with reduced liquid phase being able to be set in the range of 4-8.

It is particularly preferred in the sense of the invention that the raw material dispersion with reduced liquid phase from process step b) contains a moisture content of 10 to less than 40%, the pH of this raw material dispersion with reduced liquid phase being able to be set in the range of 4-8.

Moreover, the proposed method and the proposed pedosphere-improving granules can be characterized by the further features, namely in particular by
That the liquid phase separated in process step b) is fed to an at least partial heavy metal separation,
That the separated liquid phase at least partially cleaned of the heavy metals is then fed into process step a) to produce a raw material suspension, the reactant being able to be at least partially fed into this liquid phase before and/or when it is returned to process step a),
That the raw material dispersion with reduced liquid phase after process step b) has a solids content of 40% to 70% and/or
That the raw material dispersion with reduced liquid phase is fed to a granulation.

It may also be preferred that the granulation takes place in a fluidized bed or spouted bed reactor and/or that the granulation takes place by spray granulation and/or spray agglomeration.

In a preferred embodiment of the invention, a fractionation of the nutrient granules produced follows after the granulation, a coarse fraction and/or a fine fraction being ground and being at least partially feedable to the step a), b) and/or c). In other words, within the meaning of the invention, it is preferred that fractionation of the nutrient granulate produced follows after the granulation, wherein the coarse fraction and/or the fine fraction are ground and at least partially supplied to step a) and/or b) and/or c) can be fed.

In a further aspect of the sense of the invention, it is preferred that a total of 1 to 70% of crystallization products from a phosphorus removal step can be fed to step a), b) and/or c), wherein a drying above 100° C. based on the material temperature during drying takes place. In other words, the proportion of crystallization products from a phosphorus elimination, which can be fed to step a), b) and/or c), in total preferably in a range between 1 and 70%, with a drying above 100° C. can be based on the material temperature during drying. For the purposes of the invention, it is preferred that the products from the P elimination are raw materials which are added to the formulation.

In a further aspect, the invention relates to a device for the production of granules which comprises at least the following components:
  A first mixing vessel for supplying and/or mixing at least the inorganic secondary phosphate and the reaction agent, whereby a raw material dispersion is obtained wherein for the incubation period either the first mixing container is used and/or other containers are available, in which the raw material dispersion for Incubation time is transferred and mixed,
  A separation unit for separating at least part of the liquid phase, the separation unit being integrated in the first mixing vessel or being or being separate therefrom,
  a granulating and/or extruding unit for granulating and/or extruding the remaining raw material dispersion with reduced liquid phase from process step b), in which further granulation and/or extruding unit components can be supplied and/or the raw material dispersion are miscible, wherein there is at least one feed unit from the separation unit for transferring the raw material dispersion into the granulation and/or extruding unit,
  A recirculation unit for the separated liquid phase without heavy metal separation or after the partial separation of the heavy metals to the mixing vessel for the preparation of a raw material dispersion analogous to process step a) and/or granulation and/or extruding unit.

It is preferred for the purposes of the invention that the apparatus for the production of granules in each case comprises at least one of said components. However, it may also be preferred for different applications that the device comprises more than one piece of the different components, for example, but not limited to, two mixing containers, three granulating and/or extruding units or two return units, without being restricted thereto.

Optionally, the device for producing the granules can comprise a unit for separating the heavy metals, in which unit at least some of the heavy metals can be separated from the liquid phase separated in process step b) and can be discharged from the process, with at least one feed unit from the separation unit to transfer the partially separated liquid phase into this unit to separate the heavy metals is present. In other words, it is preferred in the sense of the invention that at least some of the heavy metals can be separated from the liquid phase separated in process step b) into the dehydrator unit and removed from the process.

It is preferred for the purposes of the invention that in the case of a separate separation unit at least one feed unit from the first mixing container for the raw material dispersion in the separation unit is present and there further components (mixing and feeding units) for mixing and for the addition of further components can be integrated.

In particular, the device for producing granules can consist of the following components:
  At least one mixing container, in or in which at least the inorganic secondary phosphate and the reactant are added and mixed, whereby either this mixing container is used for the incubation period and/or other containers are available for this purpose, into which the raw material dispersion is transferred for the incubation period will and can be mixed
  At least one separation unit in which at least part of the liquid phase can be separated, the separation unit being able to be integrated or separate from the mixing container, and in the case of a separate separation unit there being at least one feed unit from the mixing container for transferring the raw material dispersion into the separation unit and further mixing and feeding units for mixing and adding further components can be integrated there,
  At least one pelletizing and/or extruding unit in which at least the remaining raw material dispersion with reduced liquid phase from process step b) can be granulated and/or extruded, further components being fed into this granulating and/or extruding unit and/or the raw material dispersion can be mixed, at least one feed unit being present from the separation unit for transferring the raw material dispersion into the granulating and/or extruding unit, it being possible for further mixing and feed units for mixing and for adding further components to be present in the feed unit, a drying unit for drying the granules and/or extrudates produced can follow the granulating and/or extruding unit, wherein further mixing and feeding units for mixing and for adding further components may be present in the feeding unit, wherein a drying unit can be connected to the granulating and/or extruding unit for drying the granules/extrudates produced,
  At least one unit for the separation of heavy metals, in which at least part of the heavy metals from the process step b) separated liquid phase separated and discharged from the process, wherein at least one feed unit from the separation unit for transferring the partially separated liquid phase in this unit for secreting the heavy metals is present and
  At least one recirculation unit for the separated liquid phase without heavy metal separation or after the partial separation of the heavy metals to the mixing container for the production of a raw material dispersion analogous to process step a) and/or to the granulating and/or extruding unit.

It is preferred in the sense of the invention that the granulating and/or extruding unit is an intensive mixer, a granulating plate or a fluidized bed or spouted bed reactor or comprises such.

In a further aspect, the invention relates to fertilizer granules, the fertilizer granules comprising at least one inorganic secondary phosphate, and a greater than 60% neutral ammonium citrate-soluble $P_2O_5$ fraction based on the total phosphate content in the fertilizer granules. In the sense of the invention, it is preferred that the fertilizer granules or the individual granules are coated or uncoated, present or can be provided. For the purposes of the invention, it is preferred that the fertilizer granules contain at least one inorganic secondary phosphate and a $P_2O_5$ fraction which is greater than 60% soluble in neutral ammonium citrate, based on the total phosphate content in the fertilizer granules. It can also be preferred in the sense of the invention that the phosphate fraction from the inorganic secondary phosphate has a water solubility of less than 40%.

It is preferred for the purposes of the invention that the fertilizer granules in total from 0.1 to 25% humic acid, fulvic acid, their salts (humates, fulvates) and/or in total from 0.1 to 30% organic acid and/or in total 0, 1 to 50% structural materials has. It is particularly preferred for the purposes of the invention that the coated or the uncoated fertilizer granules in total from 0.1 to 25% humic acid, fulvic acid, their salts (humates, fulvates) and/or in total from 0.1 to 30% organic acid and/or in total from 0.1 to 50% Contains structural substances.

In a preferred embodiment of the invention, the fertilizer granules have one or more crystallization products from the phosphorus elimination in a concentration range between 1 to 70%. In other words, it is preferred that the one or more crystallization products have a concentration between 1 and 70%, the crystallization products originating from phosphorus elimination and being added as a nutrient component in the process according to the invention.

In a further aspect, the invention relates to the use of the proposed fertilizer granules for nutrient supply in agriculture, forestry and/or horticulture, the fertilizer granules comprising at least one inorganic secondary phosphate and a greater than 60% neutral-ammonium citrate-soluble $P_2O_5$ fraction. The granulate or its constituents are preferably coated or uncoated. It is very particularly preferred in the sense that the proposed fertilizer granulate can be used in agriculture, forestry and/or in horticulture.

It was completely surprising that the proposed pedosphere-improving granules both ensure the phosphorus supply of plants, and optimize the development of microorganisms as well as bacteria and protozoa so that the plants grow significantly better. It was by no means obvious to the person skilled in the art that pedosphere-improving granulates characterized by the mentioned production steps are suitable both for optimizing the animal living mass of the soil and for improving plant growth. This mainly concerns maize, wheat, onions, potatoes, millet, beans, apples, sugar beets, cucumbers and gherkins, grapes, tomatoes, barley and cabbages.

The total amount of phosphorus (P) and the heavy metals such as lead, cadmium, nickel are determined by inductively coupled plasma atomic emission spectrometry (ICP-OES) according to DIN EN ISO 1885: 2009. For this purpose, the sample to be determined is first digested with an aqua regia digestion in accordance with DIN EN 13346: 2001-04. To determine the soluble phosphate content, different methods, in particular different extraction methods, are known. To estimate P availability, fertilizers are tested in the laboratory with different solvents and marked accordingly. The most important solvents used are water, ammonium citrate, citric acid, formic acid and mineral acids. The EU Regulation on fertilizers also standardizes various methods for determining the phosphate solubility of fertilizers. Depending on the origin and nature of the P fertilizer to be tested, a different method can be used. In the context of the present invention, the following three extraction methods are used to characterize the solubility of the phosphate: The extraction of the water-soluble phosphorus (P) is carried out in accordance with DIN EN 15958: 2011. Extraction of the phosphorus (P) soluble in neutral ammonium citrate is carried out in accordance with DIN EN 15957: 2011. The extraction of the 2% citric acid soluble phosphorus (P) is carried out according to DIN EN 15920: 2011. The phosphate content (P) is then determined by means of inductively coupled plasma optical emission spectrometry (ICP-OES) according to DIN EN ISO 1885: 2009.

Especially with high proportions of water- and ammonium citrate-soluble phosphate it is guaranteed that a large part of the fertilizer phosphate is actually available to the plant in the short and medium term. The neutral ammonium citrate-soluble phosphorus content can be used as a guide for the medium-term availability of the fertilizer phosphorus to plants. i.e, over the period of approximately one crop rotation. The immediately available P content of a fertilizer is described by its solubility in water. The higher the water-soluble P content, the faster or easier the availability of fertilizer phosphorus for the plant. With stronger solvents, such as citric or formic acid, P-portions are also dissolved, which are available to plants in the long term or only under certain site conditions, such as low pH values. Planting and vegetation experiments have shown that there is above all a good correlation between the neutral ammonium citrate-soluble phosphate content and the growth of the plants. High water solubility makes phosphate very quickly available in large quantities, which the plant may not be able to absorb completely in growth in the same time sequence, then remains unused and possibly washed out.

According to the current scientific opinion, the use of P fertilizers that have a particularly high proportion of neutral ammonium citrate-soluble phosphate should be preferred for reasons of resource conservation. In this respect, the present invention fulfills the demand for high neutral-ammonium citrate-soluble phosphate fractions by using the proposed method fertilizer granules with a particularly high neutral-ammonium citrate-soluble $P_2O_5$ fraction of greater than 60%, preferably greater than 70%, particularly preferred greater than 80% of the total $P_2O_5$-proportion in the fertilizer granules.

In the context of the invention, fertilizers are substances or substance mixtures which supplement or adjust the nutrient supply for the cultivated plants, in particular crops, in agriculture and forestry as well as in horticulture and may optionally be combined with other materials and/or functionalized. Here, both single nutrient fertilizers, such as phosphate fertilizers, as well as complex nutrient fertilizers are understood as fertilizers. Granular fertilizers are, i.e. fertilizer granulate, a heap typically in approximately spherical form and sufficient inherent strength with an average granule size of 0.5-10 mm, preferably 1-7 mm, very particularly preferably 2-5 mm.

In the context of the invention, inorganic secondary phosphate refers to those substances which arise during the preparation, preparation or manufacture of something (residue) and have a phosphorus content greater than 5% $P_2O_5$ and a TOC content (TOC=total organic carbon) of less than 3%. Examples of secondary organic phosphates are ashes and/or slags from the mono- or co-incineration of sewage sludge, ashes and/or slags from the incineration or co-incineration of animal excretions, animal meal, animal remains and carcasses or ashes/slags from the incineration of manure and digestate as a single substance or mixtures thereof. The phosphorus compounds contained in the inorganic secondary phosphate are referred to here as phosphate, even if, in their entirety in individual cases, this should not or not fully correspond to the type of binding of phosphorus.

In the context of the present invention, a reaction medium is to be understood as a substance or a mixture which, on the one hand, dissolves and/or reacts with at least part of the phosphate supplied by the inorganic secondary phosphate and, on the other hand, at least part of the heavy metals from the inorganic secondary phosphate dissolves. Reactants are, for example, organic or inorganic acids or acid mixtures or alkalis or mixtures of different bases, in each case in undiluted or diluted form.

In the context of the present invention, the sum of the liquid substances in a coherent system is defined as the liquid phase. Thus, the raw material dispersion consists of a solid and a liquid phase. The solid phase in the context of the present invention is the sum of the undissolved substances. The liquid phase in a system, for example in a raw material dispersion, can be formed from different liquid components. Thus, liquid components can be supplied at least partly in the form of moisture, partly in a suspension or as a liquid via various substances or, for example, as water, or at least partly in the reactant, for example liquid, in particular also dilute acids may be included. For the purposes of the invention, the term "moisture" in the context of the invention corresponds to the physically bound water which adheres to the substance or mixture. The term "moisture" is also used synonymously with the term "moisture content".

The moisture or the moisture content is determined gravimetrically according to DIN 52183 in the context of the present invention. In the gravimetric moisture determination, also known as the Darr method, the sample is first weighed and then dried to constant weight at 105° C. in a drying oven to constant weight. The free water contained in the sample escapes. The weight difference is determined, which in the context of the present invention corresponds to the moisture content or the moisture content. Because the liquid phase also dissolved present components may contain, which remain when drying as a solid, is usually the percentage of the liquid phase, in part, significantly higher than the moisture.

In process step a) of the proposed method, a raw material dispersion is generated from at least one inorganic secondary phosphate and at least one reactant, the proportion of liquid phase being greater than 30% and the incubation time between the inorganic secondary phosphate and reactant being between 1 to 100 minutes.

The raw material dispersion which is used in the context of the proposed method has a significantly higher proportion of liquid phase than in comparison with conventional methods which are known from the prior art. It is known in the prior art that the phosphate ash is mixed with mineral acid directly and earth-moist and at the same time granulated. The production of a raw material dispersion envisaged in the context of the proposed invention thus has considerable technical advantages. The reactions that often occur spontaneously and are sometimes very exothermic when the phosphate-containing secondary raw materials are mixed with the mineral acid can be controlled and are controllable. The higher proportion of liquid phase according to the invention advantageously acts as a reaction buffer.

A raw material dispersion with a significantly higher proportion of liquid phase is also considerably less sticky. Stable process control is thus considerably facilitated and adhesion and blockage of system parts can thereby be effectively reduced. For this reason, the raw material dispersion produced contains a proportion of liquid phase of preferably greater than 50%, particularly preferably greater than 70%.

In a preferred embodiment of the invention, the raw material dispersion preferably contains an undissolved solid phase of less than 40% after the incubation time provided according to the invention, an undissolved solid phase, which is preferably also referred to as undissolved solid fraction, of less than 40%. In this solids content range, a particularly good and simple homogenization of the raw material dispersion produced is possible. In a particularly preferred embodiment of the invention, the raw material dispersion contains an undissolved solid phase of less than 30% after the incubation time provided according to the invention. With such conditions, the dissolving speed is relatively high, whereby the necessary reaction time can advantageously be shortened.

In a further particularly preferred embodiment of the invention, the raw material dispersion contains a proportion of solid phase of less than 15% after the incubation time provided according to the invention.

With this low undissolved portion and high liquid phase portion, respectively, relatively low concentrations of the dissolved heavy metals occur in the liquid phase because the dissolved portion of heavy metals is diluted by the high portion of the liquid phase. The partial separation of the liquid phase in step b) then results in a lower heavy metal content in the non-separated liquid phase remaining separated from the solid. This results in a desired higher heavy metal separation in step b) with the same separation intensity.

Corrosion problems can also be advantageously solved by producing the raw material dispersion in process step a). The reaction between the inorganic secondary phosphate and the reactant can preferably take place in an acid-resistant stirred tank with an acid-resistant agitator, the majority of the free acid or alkali being used up after this reaction and thus being less harmful to the subsequent parts of the system. In addition, the raw material dispersion produced can also be neutralized after the reaction, if necessary. If no heavy metal separation is required, the neutralization can already take place in process step a). If heavy metals are to be separated, neutralization should take place via a pH of 2, in particular above a pH of 3, after the partial separation of the liquid phase in process step b), since otherwise the heavy metals will precipitate when the pH increases. Preference is therefore given in the context of the invention to adjust the pH of the raw material dispersion before granulation from 2 to 10, particularly preferably from 3 to 9, very particularly preferably from 4 to 8. To adjust the preferred proportion of liquid phase one or more liquid components of the raw material dispersion can or may be added.

In a preferred embodiment of the invention, the liquid phase from process step d) is at least partially recycled to process step a). This liquid phase from process step d) may still contain a proportion of the dissolved nutrient components, for example phosphate. Alternatively or additionally, water and/or liquid nutrient-containing solutions may also be added. Nutrient-containing solutions preferably contain nutrients and/or trace substances contained in the proposed fertilizer granules.

The phosphate contained in the inorganic secondary phosphate advantageously serves as a nutrient component in the fertilizer produced. High phosphate levels, particularly in the case of the inorganic secondary phosphate, are accordingly desired here. Inorganic secondary phosphates with more than 10% $P_2O_5$, more preferably with more than 15% $P_2O_5$ and very particularly preferably with more than 20% $P_2O_5$ are therefore preferred. In other words, $P_2O_5$ contents of greater than 10%, more preferably of greater than 15%, and most preferably of greater than 20% are preferred.

In addition, the inorganic secondary phosphate may contain further components. It is advantageous if further nutrient components are contained, for example N, K, Mg or other micronutrients. In the proposed method, the inorganic secondary phosphate(s) react with at least one reactant. The solubility of the phosphate contained in the inorganic secondary phosphate is advantageously increased.

If an at least partial heavy metal separation is also to take place, it is preferred for the purposes of the invention that the reactant is adapted to also dissolve a portion of the heavy metals contained, preferably as high as possible. The reaction agent is selected in particular in such a way that it preferably meets the stated requirements when it is given up.

The phosphate component present in the inorganic secondary phosphate typically has a relatively low solubility. Accordingly, such substances as sewage sludge ash are only suitable as fertilizers to a limited extent. These inorganic secondary phosphates typically have a water solubility of less than 30% and a neutral ammonium citrate solubility of less than 50%, preferably in each case based on the total phosphate content in the inorganic secondary phosphate. For a meaningful use as fertilizer, it is preferred for the purposes of the invention that this insufficiently soluble phosphate is converted into a more soluble and thus better plant-available phosphate. According to the invention, the conversion takes place by at least partially reacting the inorganic secondary phosphate with at least one reactant.

The reactant is preferably adapted to dissolve at least a portion of the phosphate(s) contained in the organic secondary phosphate and/or to react with it or to convert the phosphate by reaction in such a way that a phosphate which is more readily soluble in ammonium citrate is formed. In the subsequent process, for example by precipitation, recrystallization or during drying, the phosphate preferably dissolved by the reactant advantageously forms a phosphate which is more readily soluble in ammonium citrate than in the inorganic secondary phosphate. For the purposes of the invention, the term "better neutral ammonium citrate-soluble" means that the neutral ammonium citrate solubility of the phosphate in the inorganic secondary phosphate is higher after the reaction with the reagent. An increase in the neutral ammonium citrate solubility by more than 20% is preferred, and an increase by more than 50% is particularly preferred.

A corresponding calculation example may be as follows: the neutral ammonium citrate solubility of the phosphate fraction from the untreated secondary phosphate of 50% is increased by the reaction with the reagent by 20% to 60%. When using acids, the proposed method differs in particular from the prior art that the phosphate reacts at least partially and the solubility is increased.

For example, the type and concentration of the reactant, the reaction procedure and reaction time can influence the resulting neutral ammonium citrate solubility of the inorganic secondary phosphate. The phosphate fraction from the inorganic secondary phosphate then preferably has a neutral ammonium citrate solubility of greater than 60%, preferably greater than 70%, particularly preferably greater than 80% in the fertilizer granules produced. Due to the preferred reaction or conversion of the phosphate and the preferred resulting neutral ammonium citrate solubility from the inorganic secondary phosphate, better phosphate plant availability and thus an improved fertilizing effect are advantageously achieved.

It is preferred for the purposes of the invention that the reaction between inorganic secondary phosphate and reactant increases the solubility of the phosphate from the inorganic secondary phosphate. As shown, the solubility of phosphate in fertilizers is determined by different methods.

The P solubility is preferably determined by the nature of the P bond and the solution environment. Due to the nature of the reaction procedure in process step a), it is possible to influence the binding of the P, i.e., the phosphate phases which form. This can be done, for example, by the nature and concentration of the reaction medium, the reaction time and/or the process temperature.

In a preferred embodiment of the invention, the reaction is preferably controlled in such a way that the phosphate fraction from the inorganic secondary phosphate subsequently has a neutral ammonium citrate solubility of greater than 60% and a water solubility of less than 40% in the fertilizer granules produced. Adjusting the solubilities in this form will cause the phosphate to be sufficiently plant-available on the field for the plants over about one growing season, but will not be washed out during this time. A leaching can typically take place if a very good solubility in water, i.e., significantly higher, is provided here. In a particularly preferred embodiment of the invention, a neutral ammonium citrate solubility of greater than 80% and a water solubility of less than 30% are set for the phosphate fraction from the inorganic secondary phosphate in the fertilizer granules produced. Surprisingly, it has been found that, in particular, winter rye experiences a particularly favorable P supply over a growing period.

In another particularly preferred embodiment of the invention, a neutral ammonium citrate solubility of greater than 90% and a water solubility of less than 15% is set for the phosphate content from the inorganic secondary phosphate in the fertilizer granules produced. This ratio is particularly favorable for wheat plants.

The type and concentration of the reactant, the reaction procedure and reaction time can also influence the type and proportion of the dissolved heavy metals. For example, a higher acid strength preferably causes a higher proportion of dissolved heavy metals. A higher proportion of dissolved heavy metals is preferred in this process step, since more heavy metals can be removed in process step b) with the partial separation of the liquid phase and the at least partial separation of the heavy metals in process step d) can be supplied.

In a preferred embodiment of the invention, enough acid is therefore added to the raw material dispersion so that a pH of less than 1 is established during the incubation period. This already dissolves a significant proportion of heavy metals. In a particularly preferred embodiment of the invention, so much acid is added to the raw material dispersion that a pH value of less than 0.5 is established during the incubation time. The heavy metals arsenic and lead in particular are already almost completely dissolved. If the pH value is further reduced to less than 0.2 during the incubation period, as in a very particularly preferred embodiment of the invention, other heavy metals also increasingly go into solution.

In a preferred embodiment of the invention, at least one reaction medium is used which comprises at least one of the elements nitrogen (N), sulfur (S), potassium (K) and/or phosphorus (P), for example phosphorous acid ($H_3PO_3$), Phosphoric acid ($H_3PO_4$), nitric acid ($HNO_3$), sulfuric acid ($H_2SO_4$), sulfurous acid ($H_2SO_3$) and/or potassium hydroxide solution (KOH). By using such reactants, additional nutrient components, such as nitrogen, sulfur, potassium and/or phosphorus, are added to the granules accordingly. The nutrient binding form of the nutrients contained in the reactant, e.g. nitrogen and/or sulfur, can be converted into a form suitable for the fertilizer. In a particularly preferred embodiment of the invention, the reaction medium is a dilute or undiluted phosphoric acid and/or a phosphorous acid or at least a dilute or undiluted acid mixture with proportionally contained phosphoric acid and/or phosphorous acid. The advantage here is that the proportion of phosphorus in the raw material dispersion and thus in the fertilizer produced therefrom is increased by the reactant. Thus, the reagent advantageously provides not only a valuable nutrient content, but in particular favors the production of phosphate fertilizers. For example, fertilizer granules with a total $P_2O_5$ content of greater than 35%, particularly preferably greater than 40% and a neutral ammonium citrate-soluble phosphate fraction thereof of greater than 80%, particularly preferably greater than 90% can be produced. It is particularly preferred for the purposes of the invention that the total content of $P_2O_5$ is greater than 35%, particularly preferably greater than 40%.

The components of the raw material dispersion can be combined in any order. For the purposes of the invention, it is necessary for the reactant in process step a) to react sufficiently with at least part of the phosphate supplied by the inorganic secondary phosphate. In the context of the invention, the term "reacting adequately" means that the desired improvement in the neutral ammonium citrate solubility of the phosphate occurs. In addition, preferably at least part of the heavy metals are dissolved. Accordingly, an incubation time is provided in process step a) in the sense of allowing the reactant to act on the inorganic secondary phosphate. The incubation according to process step a) takes place over a period in the range from 1 to 100 minutes, preferably in the range from 5 to 60 minutes and particularly preferably in the range from 10 to 30 minutes. The order in which the components are brought together, the chronological sequence and the incubation time can influence, for example, the reaction taking place and thus also the proportion of dissolved heavy metals and the neutral ammonium citrate solubility of the phosphate in the fertilizer granules produced. Surprisingly, it has been found that a relatively short residence time is sufficient to increase the ammonium citrate solubility.

In a preferred embodiment of the invention, the incubation time is therefore set between 10 and 60 minutes, in particular to increase the solubility in ammonium citrate. In a particularly preferred embodiment of the invention, the incubation time is set to 10 to 30 minutes. Here, too, high ammonium citrate solubilities can be achieved, and the shorter incubation time can advantageously reduce the dimensions of the reaction vessels, so that process costs can be reduced accordingly.

The incubation time to achieve the desired solubilities also depends, for example, on the nature of the reaction agent used. Thus, strong acids, such as concentrated mineral acids, or strong bases, such as concentrated NaOH, typically result in an accelerated reaction, and a shorter incubation time is required. However, if weaker acids, such as organic acids such as citric or oxalic acid, are used, a longer incubation period is required. In a preferred embodiment of the invention, the incubation time is set in a range between 30 and 100 minutes. To increase the solubility in water, surprisingly longer reaction times are required. Therefore, in another preferred embodiment of the invention, the incubation time is set between 60 to 100 minutes.

A higher process temperature preferably increases the reaction rate between the inorganic secondary phosphate and the reactant and thus shortens the necessary incubation time. In a preferred embodiment of the invention, the process temperature during the incubation of the inorganic secondary phosphate and the reactant is therefore set above 30° C., particularly preferably above 40° C. and very particularly preferably above 50° C.

The proposed separation of the reaction for at least partial conversion of phosphate from the inorganic secondary phosphate from the granulation preferably solves the technical problem that the exothermic, in part spontaneous and violent reaction severely hinders the granulation process. The separation of the reaction from the granulation provided according to the invention is preferably to be understood in the technical sense in such a way that in process step a) the vast majority of the reaction takes place. However, it can also be preferred that the reaction also continues in process steps b) and c), but then in a significantly reduced intensity. By adhering to the incubation time provided according to the invention, the intensity of the possible continuation of the reaction which is still present is no longer an obstacle to the granulation process.

In a preferred embodiment of the invention, process step a) is preferably controlled such that more than 80% of the increase in neutral ammonium citrate solubility of the inorganic secondary phosphate achieved in process step a) is reached over the entire process. That is, if the reaction were stopped by rapid drying after process step a), the phosphate treated with the reactant from the inorganic secondary phosphate of this reaction product thus stopped already shows at least 80% of the neutral ammonium citrate solubility of a reaction product which is not stopped, but process steps b) and c) still go through.

Further components can be added to the raw material dispersion in process step a) and/or after process step b). Other components here are generally substances which can improve the process control and/or the properties of the fertilizer granules, such as, for example, nutrient-containing components, gelling and defoaming agents, structural materials, agents for pH adjustment, urease inhibitors, ammonium stabilizers, humic acid, organic acids and/or water. Thus, in a preferred embodiment of the invention, at least one or more nutrient-containing component(s) are added as further components. In a preferred embodiment of the invention, at least one or more nutrient-containing component(s) are added as further components.

In the context of the invention, nutrient-containing components are preferably substances which supply or supplement the range of nutrients for the cultivated plants in order to control or support the growth and development of the plants. The nutrient-containing components include, for example, nitrogen (N), phosphorous (P), potassium (K), magnesium (Mg), sulfur (S), vital trace elements individually or in combination. For example, through the possibility of adding nutrient-containing components, the nutrient composition in the fertilizer granulate can be adapted particularly precisely to the soil and/or plant-specific needs. In addition, the typical fluctuation range of the composition of the inorganic secondary phosphate can be compensated for in order to ensure a uniform fertilizer quality.

In a particularly preferred embodiment of the invention, additional phosphate carriers, for example ammonium phosphate, potassium phosphate, crystallization products from the phosphorus elimination, such as struvite, brushite or hydroxy-apatite-like Ca—P phase, are added in an amount such that a fertilizer granulate with a total $P_2O_5$ content of more than 35%, particularly preferably more than 40% and a neutral ammonium citrate-soluble phosphate fraction thereof of more than 80%, particularly preferably more than 90%. In another preferred embodiment of the invention, crystallization products from phosphorus elimination, such as struvite, brushite or hydroxy-apatite-like Ca—P phase, are added in a range of 1 to 70%, based on the finished pedosphere-improving granule, thereby forming a nutrient granule having a total $P_2O_5$ content of greater than 15%, a neutral ammonium citrate soluble phosphate content of greater than 60% thereof and a water solubility of less than 30%, also based on the total $P_2O_5$ content.

In a very special embodiment of the invention, crystallization products from the phosphorus elimination in the range from 10 to 40%, based on the finished pedosphere-improving granules, are added, nutrient granules having a total $P_2O_5$ content of greater than 15% and having a phosphate fraction which is soluble in neutral ammonium citrate of which, based on total $P_2O_5$, greater than 85% and a water-soluble phosphate content, based on total $P_2O_5$), of less than 20% each result in relation to the composition of the nutrient granules.

One or more structural material (s) can be used as further components, for example peat, humus, pyrolysis substrates from biomass, biochar from hydrothermal carbonization (HTC), but also sewage sludge, digestate, liquid manure, animal waste, animal and/or fish meal. The term "digestate" be in the context of the invention, the liquid and/or solid residue that remains in the fermentation of biomass.

In the context of the invention, the term "liquid manure" preferably describes a mixture of feces and urine from farm animals in combination with litter with changing water content. Depending on the type and concentration of this or these structural material (s), the fertilizing effect can be set and/or a soil-improving effect can be achieved when using the fertilizer granules. The fertilizing effect is preferably influenced by the fact that the structure properties of the fertilizer granules produced and thus its properties, such as, for example, the porosity, size of the pores, strength and/or solubility, can be set by adding the structural material. In this way, for example, the nutrient release can be specifically adapted to the plant growth and the time-dependent nutrient requirements of the plant. A targeted improvement of the soil can also be achieved by adding a structural substance in the fertilizer granulate if the structural substance, for example, leads to humus formation, to improve the soil structure and/or to improve the air and/or water balance of the soil when using the fertilizers in of agriculture. This can, for example, promote root growth, activate soil life and/or stimulate plant vitality against stressful situations.

In one embodiment of the invention, it is preferred that a total of between 5 and 50% of structural material, based on the finished pedosphere-improving granules, is added, since it has surprisingly been found that in this concentration range in particular the formation of humus is very strongly promoted and therefore a particularly good soil and Structural improvement is affected.

It is very particularly preferred that the granules formed have a carbon content of greater than 5 to 25%, since it was unexpectedly found that in this area of the carbon content in particular, in addition to the formation of humus, the air and water balance of the soil is particularly favorable for the growth of for example, winter barley and corn can be set.

The fertilizing effect is preferably influenced by the fact that the structure properties of the pedosphere-improving granules produced and thus its properties, such as, for example, the porosity, size of the pores, the strength or solubility, are set by adding the structural material. In this way, for example, the nutrient release can be specifically adapted to the plant growth and the time-dependent nutrient requirement of the plant.

In another preferred embodiment of the invention, therefore, between 0.1% and 5% of structural material is added. This comparatively low concentration means that a particularly large number of nutrient components can be integrated in the fertilizer, as a result of which the fertilizing effect of the granules in this exemplary embodiment is essentially increased. Surprisingly, it has now been found that the precise proportion of structural material in this area leads to a pore structure that greatly promotes the solubility of these nutrient components. A proportion of structural material of 1 to 3.0% is particularly preferred, since it is precisely in this area that there is good porosity for good solubility and, in addition, in this concentration range there is a particularly good distribution of small pores in the basic structure, which is advantageous a particularly high strength results.

If residual materials, such as sewage sludge in particular, are to be used as structural substances, there is basically a risk of contamination and the spread of pathogens and thus the possibility that pathogens reach humans and animals via food and feed and thus endanger them. Therefore, in one preferred embodiment of the invention, when one or more residues are used as structural material, a sanitation step to interrupt infection cycles by killing pathogens, bacteria, etc. is integrated into the proposed method. For sanitation, there are methods available, such as the addition of chemical or bactericidal agents, sanitation through an extreme pH shift, for example by adding quicklime or hydrated lime, or thermal treatment. Such a process step for sanitizing the critical residue or critical residues can be carried out at a suitable point in the process.

Such sanitation of the residues can take place before the addition of the residue as a structural material for the raw material dispersion. In this way, for example, a residual material such as sewage sludge can first be mixed separately with quicklime and the mixture can be added to the basic dispersion after a sufficiently long exposure time.

In a particularly preferred embodiment of the invention, the sanitation takes place after addition of the critical residual material as structural material to the raw material dispersion by a thermal treatment of at least 10 minutes, preferably longer than 20 minutes and above 60° C., particularly preferably above 75° C. The pathogens are advantageously largely destroyed by this temperature effect. In this embodiment of the invention, the thermal treatment of the critical residues can take place, for example, in process step a) and/or d), for example by heating the raw material dispersion or heating itself by exothermic reactions.

In a preferred embodiment of the invention, humic acid and/or fulvic acid and/or their salts, such as humates and/or fulvates, are added. These substances advantageously have growth-promoting properties. So the nutrient absorption capacity of the root is significantly increased and thus stimulates growth. By adding them, plant growth and cell formation are promoted. They stimulate the cell membranes as well as the metabolic activities and thereby increase the germination rates. Also important plant enzymes are particularly well stimulated. The powerful root formation supports the nutrient uptake capacity. The plants strengthened in this way are significantly less susceptible to diseases. The addition of these substances can increase the P uptake of the plants, since it blocks the P adsorption of the soil and prevents the precipitation of P into poorly soluble compounds by complexing Ca, Al, and Fe. Surprisingly, it was found that adding these substances in a range of 0.1-25% (in relation to the finished pedosphere-improving granules) results in a significant increase in the plant-available phosphate in the soil and thus an increased P uptake by the plants.

The addition of these substances in a proportion of between 0.1 and 10% (based on the finished pedosphere-improving granules) is particularly preferred, since a considerable increase in the fertilizing effect is achieved in this quantity range and consequently the necessary amount of fertilizer is reduced accordingly by up to 40%. The addition of these substances in a quantity range of 0.1-5% (based on the finished pedosphere-improving granules) is very special, since this area results in a particularly favorable economic relationship between the costs for these substances and the resulting improved properties.

In a further preferred embodiment of the invention, organic acid is added in solid and/or liquid form. Organic acids are, for example, ascorbic acid, acetic acid, formic acid, gluconic acid, malic acid, succinic acid, oxalic acid, tartaric acid and citric acid. Organic acids play an essential role in the phosphate uptake of plants from the soil. In particular, due to the presence of organic acids at the root system, the plants can absorb sufficient phosphate, typically microorganisms forming these organic acids in the ecosystem. Surprisingly, it has now been found that the phosphate uptake of the plants is increased when one or more organic acids are already partially integrated in the fertilizer granules supplied, preferably in total in a range from 0.1 to 30% (based on the finished pedosphere-improving granules).

It is presumed that these, with added organic acids, preferably take on a comparable function directly in the root area of the plant, without these organic acids first having to be generated by microorganisms. Citric acid, oxalic acid and/or tartaric acid are preferably used individually or in combination, since these organic acids are relatively inexpensive and available in sufficient quantities.

Particularly preferred is the use of citric acid, oxalic acid and tartaric acid individually or in combination The use of citric acid, oxalic acid and tartaric acid, individually or in combination, in a quantity range of 0.1% to 10% (based on the finished pedosphere-improving granules) is particularly preferred, since the absorption-improving effect of these acids in relation to the raw material costs is particularly favorable here. The listed proportions of organic acids in the fertilizer granules can either be added as an additional component and/or when organic acids are used as reactants after the reaction (at least proportionately further in this quantity range) and can thus be converted into the fertilizer granules.

Defoaming and dispersing agents can also be added as further components. Defoaming agents are advantageous, for example, when a strong gas-forming reaction starts or a foam forms during the combination of individual substances, for example when producing the basic dispersion. The viscosity can be adjusted, for example, by means of the dispersant. Agents for pH adjustment, such as alkalis, hydroxides, basic salts, ammonia or quicklime, can also be added as further components. In this way, for example, acid residues still present, for example when using or forming acids, can be neutralized and/or the pH of the fertilizer produced can be adjusted specifically.

The substances used, such as inorganic secondary phosphate and other components, can be ground individually, in combination or as a whole raw material dispersion. This is advantageous, for example, if the present particle or aggregate size of one or more feedstocks is not sufficiently fine, for example, to achieve sufficient homogeneity, or this can lead to process engineering difficulties, for example nozzle clogging. By reducing the particle or aggregate size, this can advantageously be improved. The solubility of substances or contained compounds can also be improved, for example the solubility of phosphate-containing ashes or slags. Grinding of the raw material dispersion, for example in process step a) and/or c), may also be necessary if agglomerates, aggregates or precipitation products form as a result of the reaction within the raw material dispersion, which disrupt the further process flow, for example conveying or pumping or atomizing. Depending on the type of material to be ground and the desired particle size and particle size distribution, different dry or wet grinding technologies can be used with or without grinding aids. The aggregates used for dry or wet grinding can be, for example, ball mills, pin mills, jet mills, bead mills, stirred ball mills, high-performance dispersants and/or high-pressure homogenizers.

The order in which the further components are added can take place depending on the requirements of the process control and/or the desired reaction sequence.

Thus, for example, in process step a) all or some of the further components can be added. The addition can be added to the dispersion already produced from at least one inorganic secondary raw material and at least one reactant and/or also during the production of this dispersion. It is also preferred that all or part of the further components are initially introduced and only then is the dispersion of at least one inorganic secondary phosphate and at least one reactant or the components for forming this dispersion added.

In a preferred embodiment of the invention, at least one inorganic secondary phosphate is mixed with at least one reactant, preferably in combination with water. In this case, the addition of the water can take place before, with and/or after the reactant. As a result, the reaction agent (s) can initially react with at least parts of the phosphate from the inorganic secondary phosphate (s) without being disturbed by other components. Depending on the type of components, the reaction between the reactant and phosphate from the inorganic secondary phosphate can be disturbed, prevented or reduced in the reaction rate by these components, for example if this changes the pH and/or a, for example partial, neutralization of the Reaction agent takes place. It is particularly preferred in this embodiment of the invention that the liquid phase from process step d) or possibly further components is only added after 5 to 60 minutes, particularly preferably 10 to 30 minutes.

Alternatively, all or part of the further components can only be added after process step b) before or during the granulation. This can be advantageous for process steps b) and/or d) if, for example, the additional components are e.g., present as a solid when added before process step b). It can also be preferred in the sense of the invention that the additional components are dissolved. In process step b) of the proposed method, part of the liquid phase is separated from the raw material dispersion produced in process step a) and process step d) is added. The remaining residue from the solid and/or undissolved portion of the raw material suspension with the remaining portion of the liquid phase, which has not been separated, is fed to process step c). The amount of liquid phase to be separated in this process step is selected according to the requirements of the subsequent granulation in process step c) and/or the requirements for an optional at least partial heavy metal separation in process step d). For example, the type of granulation required decides the amount of liquid phase to be separated.

In a preferred embodiment of the invention, so much liquid phase is removed that the proportion of non-separated liquid phase remaining in the solid is less than 25%, preferably less than 20% and particularly preferably less than 15%. Such a portion should preferably be referred to as "humid earth" in the context of the invention. The advantage of such a proportion of non-separated liquid phase is that an earth-moist mixture can be granulated or extruded directly and relatively little liquid phase, for example in particular water, has to be evaporated in order to produce the particularly dry fertilizer granulate. This saves considerable energy costs.

In another preferred embodiment of the invention, so much liquid phase is removed that the proportion of non-separated liquid phase remaining in the solid is greater than 25%, particularly preferably greater than 35%. In such a suspension, the components can be mixed very homogeneously, and this advantageously results in better homogeneity of the fertilizer granules.

In another preferred embodiment of the invention, so much liquid phase is removed that the separated wet solid can be referred to as earth-moist. The term "earth moist" defines a consistency in the context of the present invention. In concrete technology, a concrete with a stiff consistency with a water cement value ≤0.40 is generally referred to as earth-moist concrete. In analogy to this definition, an earth-moist raw material mixture is to be understood as a range of consistency of the moist solid comparable to a consistency like earth-moist concrete. On the one hand, this preferred range of consistency is limited by a relatively dry mixture with more than 5% moisture (based on the mixture of moist solid), which cannot be molded in the hand, i.e. does not disintegrate like powder. On the other hand, the range is preferably limited by the fact that the mixture of raw materials clump in the hand and—for example, like a snowball—shapes and not without force, such as vibration, dissolves. In this preferred embodiment of the invention, the moisture is 5% to less than 40%. In other words, it is preferred in the sense of the invention that the moisture is in a range between 5 and 40%. Since the non-separated liquid phase can also contain dissolved components which remain as a solid during drying, the percentage of the undissolved liquid phase in this preferred earth-moist mixture is in a range between 10 and 70%.

In a particularly preferred embodiment, the moisture is 10% to less than 30%. In other words, it is preferred in the sense of the invention that the moisture is in a range between 10 and 30%. The advantage of this embodiment of the invention is that an earth-moist mixture with this moisture content can typically be granulated directly by means of granulating plates.

In another particularly preferred embodiment of the invention, this preferred range for the moisture from 10% to less than 30% is set by adding further, preferably solid and/or largely dry components.

It is advantageous here that after the solid/liquid separation, the percentage of non-separated liquid phase or the moisture in the solid can initially be higher, which advantageously simplifies the solid/liquid separation and makes it more energy-efficient. By adding further components, which are preferably dry and/or at least have a low moisture content, the resulting percentage of moisture content in the overall mixture is preferably reduced to such an extent that the preferred moisture content is obtained.

In a very preferred embodiment of the invention, so much liquid phase is removed that the proportion of non-separated liquid phase remaining in the solid is in a preferred range between 30 and 70% (based on the total mixture of the separated wet solid.

If an at least partial heavy metal separation is to be carried out in process step d), the proportion of liquid phase to be separated off can preferably also be adjusted accordingly thereafter. Thus, in process step a), at least some of the heavy metals are preferably dissolved by the action of the reactant. By separating off a part of the liquid phase, in which the dissolved heavy metals are in particular, it is preferred in the sense of the invention that firstly as high a proportion of these dissolved heavy metals as possible is separated from the undissolved fraction.

In the sense of the invention, this is preferably achieved by separating as much of the heavy metal-containing liquid phase as possible from the solid phase in this process step. In a preferred embodiment of the invention, therefore, so much liquid phase is removed that the solid portion only has a remaining portion of the liquid phase, not separated from the solid phase, of less than 70%, particularly preferably less than 60% and very particularly preferably contains less than 50% based on the wet undissolved portion. For the purposes of the invention, it is particularly preferred that the solid fraction is less than 70%, particularly preferably less than 60% and very particularly preferably less than 50%, based on the moist solids.

The separation of the highest possible proportion of these dissolved heavy metals from the undissolved proportion can preferably also be achieved in the sense of the invention in that the concentration of the heavy metals in the liquid phase remaining in the solid, preferably not separated, is as small as possible. Assuming a constant total amount of dissolved heavy metals, the concentration of the heavy metals in the liquid phase is preferably largely determined by the total amount of liquid phase. If a higher total amount of liquid phase is added to the raw material dispersion before the partial separation of the liquid phase, the concentration of the heavy metals therein is preferably smaller, preferably despite the same total amount of dissolved heavy metals. If you now separate in an analogous manner so that the same amount of liquid phase remains in the solid phase, this mixture preferably contains fewer dissolved heavy metals in total and more heavy metals can be fed to the heavy metal separation in process step d) with the separated liquid phase. Therefore, in a preferred embodiment of the invention, the raw material dispersion is adjusted before the separation in such a way that the solids content is less than 50%, particularly preferably less than 30% and very particularly preferably less than 10%. This preferred solids content can be set before, during and/or after the reaction between the at least one inorganic secondary phosphate and the at least one reactant. For the purposes of the invention, the term "solids content" or the term "solids content" represents the percentage of fertilizer that forms from the dispersion of raw materials. The terms are used synonymously in the sense of the invention and include the insoluble fraction and the dissolved nutrients which are converted into the fertilizer granules.

The partial separation of the liquid phase in the sense of the present invention can be carried out continuously and/or discontinuously in one or more steps, for example by filtering or centrifuging. The filtration can be carried out discontinuously, for example using autopress, pressure filters, stirring pressure filters, suction filters, plate filters, (pressure) leaf filters, bag filters, candle filters, bag filters, layer filters, filter presses, e.g. frame filter presses, chamber filter presses, membrane filter presses; Plate filters and/or bulk filters or continuously, for example by means of cross-flow filtration, shear gap filters, tubular rotor filters, band filters, rotary pressure filters, drum filters, vacuum rotary filters, disc pressure filters and/or sliding belt presses, without being restricted to this.

The centrifuging can be carried out continuously by, for example, sieve centrifuges, screen screw centrifuges, impact ring centrifuges, sliding centrifuges, push centrifuges, vibrating centrifuges, tumble centrifuges and/or solid bowl centrifuges, or discontinuously, for example by suspended pendulum centrifuges, horizontal peeling centrifuges, inverting filter centrifuges and vertical centrifuges, or push bags. It is preferred in the sense of the invention that the solid-liquid separation is carried out by means of filter presses or vacuum belt filters. Before or during the partial separation of the liquid phase, the raw material dispersion can be conditioned to improve or simplify, for example, filtration or sedimentation. For example, flocculants or viscosity adjusting agents may be added With such a possible conditioning, it is preferred, in particular in the case of a desired heavy metal separation, that the predominant portion of the dissolved heavy metals also remains dissolved.

For example, if the dissolved heavy metals are precipitated, for example, preferably partially, they can preferably be separated off with the solid and thus advantageously do not reach process step d) with the partial heavy metal separation.

When the liquid phase is partially separated off, it is preferably not absolutely necessary for all solid constituents to be completely removed from the separated liquid phase. In particular, very fine solid particles, which are preferably referred to as suspended particles within the meaning of the invention, can preferably remain in the separated phase. On the one hand, this simplifies the separation process, for example in the case of filtration or centrifugation, since in particular the complete separation of fine particles is very complex and expensive in the case of a solid-liquid separation with a high solids loading. On the other hand, these fine particles or suspended particles can be used advantageously in process step d) in the optional at least partial separation of the heavy metals, for example as nucleating or crystallization agents. However, if too much undissolved solids get into the separated liquid phase and thus into process step d), this can also be disadvantageous, for example if these solids entered are separated off with the heavy metals in process step d). High levels of solids then increase the remaining heavy metal-containing residue. It is therefore preferred that a solids content of less than 10%, particularly preferably less than 5% and very particularly preferably less than 2% is set in the separated liquid phase.

In process step c) of the process according to the invention, the fertilizer granules are produced.

It is preferred in the sense of the invention that further components can be added to the raw material dispersion from process step b) with partially separated liquid phase after process step b). By deliberately adjusting the type and composition of the raw material dispersion and the type and intensity of the mixing, it is possible advantageously to influence the ongoing reaction and thus the neutral ammonium citrate solubility of the phosphate, but also other fertilizer properties.

Additional components can be supplied, for example, when the raw material dispersion is transferred from process step b) to process step c) or in a mixing device. The mixing device can be, for example, a mixing container with an agitator, roller mixer, which is preferably also referred to as a drop mixer, drum mixer or rotary mixer, shear mixer, compulsory mixer, ploughshare mixer, planetary mixer kneader, Z mixer, Sigma kneader, fluid mixer or intensive mixer.

The selection of the suitable mixer depends in particular on the free-flowing properties and the cohesive forces of mixed material. If no further components are added, the raw material dispersion transferred from process step b) can still be mixed, for example for further homogenization or to prevent agglomeration and/or aggregation formation. The granulation or extrusion can preferably take place during the admixing of further components and/or afterwards, for example in the same mixing device or in a separate granulation or extrusion unit or in a separate granulating or extrusion unit which, for example, comprises pelletizing or granulating plates, granulating drums, fluidized bed granulators, spray granulators or extruders. It is preferred in the sense of the invention that the proportion of the liquid phase not separated in process step b) and thus remaining in the solid in this process step has a considerable influence on the reactions taking place, the type of granulation, the product quality and/or the economics of the process. The total proportion of the liquid phase before the granulation and/or extrusion can be set, for example, via the process control in process step b) and the type and amount of the liquid, moist or dry components supplied after process step b). If necessary, partial drying can also take place before the granulation, for example in order to adjust the total proportion of the liquid phase before the granulation and/or extrusion.

In a preferred embodiment of the invention, the raw material dispersion in process step c) or the moist solid is adjusted so that it contains a moisture of less than 30%, preferably less than 25% and particularly preferably less than 20%. The preferably earth-moist mixture can preferably be granulated and/or extruded directly. In addition, relatively inexpensive granulation and/or extrusion processes or technologies, such as, for example, roller mixers, shear mixers, ploughshare mixers, planetary mixer kneaders, intensive mixers and/or extrusion processes can be used.

The tendency to stick required for granulation can preferably also be set by different substances, such as, for example, binders. These can be added, for example. The advantage of this preferred embodiment of the invention is that a good roundness of the granules in the preferred granule size range is achieved and that the granulation technology and the process costs are inexpensive to use.

Thus, for example, in a particularly preferred embodiment of the invention, the separated raw material dispersion from process step b), optionally with further components, is added to an intensive mixer, for example an intensive mixer type R from company Eirich, the liquid phase fraction preferably being adjusted in this way and, if appropriate, binders added in this way is that the intensive mechanical mixture results in green granules with a desired grain size, preferably in a range from 1 to 10 mm, particularly preferably from 2 to 5 mm. For the purposes of the invention, it is preferred that green granules comprise at least all components of the fertilizer granules, the green granules preferably comprising a liquid phase component, which in the sense of the invention is also referred to, for example, as "moisture", wherein this liquid phase component can preferably be removed by drying.

In a likewise particularly preferred embodiment of the invention, the granulation takes place on a pelleting or granulating dish. For this purpose, the separated raw material dispersion from process step b), if appropriate with further components which can be added to the raw material dispersion before and/or on the pelletizing or granulating plate, are fed to the pelleting or granulating plate. In the sense of the invention, it is preferred that a liquid component, preferably in combination with a binder contained therein or supplied separately, is sprayed onto the raw material dispersion on the granulation plate. In a preferred form of the invention, the liquid component is water. The addition of the liquid component and the rotation of the pelletizing or granulating plate advantageously form the green granules, which can be dried during and/or after the granulation to form the fertilizer granules. The advantage of this embodiment of the invention is that the granulation and the necessary technology are particularly inexpensive. In addition, this simple granulation technology is less prone to repair.

In another likewise preferred embodiment of the invention, the raw material dispersion in process step c) is or is adjusted such that the proportion of the liquid phase is greater than 25%, preferably greater than 35%.

In a particularly preferred embodiment of the invention, the granulation takes place in a fluidized bed or spouted bed reactor, particularly preferably by spray granulation or spray agglomeration. Such apparatuses are known to the person skilled in the art and are offered for example by company Glatt with the AGT or GF series.

For this purpose, the raw material dispersion, including any additional components, which has been separated off in process step b) is fed to a fluidized bed reactor. The additional components can be, for example, nutrient-containing components, dispersing and defoaming agents, agents for adjusting the pH value and/or water, which can be added individually or in combination. In a particularly preferred embodiment of the invention, the supply takes place by spraying, for example by spraying through nozzles. For this purpose, it is preferred for the purposes of the invention that the raw material dispersion is pumpable and sprayable. This can preferably be achieved in that, for example, the proportion of liquid phase is sufficiently high, for example in that correspondingly necessary amounts of preferably water are added. Large amounts of liquid phase preferably favor the stability and pumpability of the raw material dispersion and thus simplify technical operation. These positive effects can be attributed in particular to a lower tendency to precipitate, crystallize and/or form gels, without being limited to them. However, since the fertilizer granules to be produced should have a small proportion of liquid phase or a moisture content which is preferably less than 5%, particularly preferably less than 2%, it is preferred in the sense of the invention that the liquid phase, for example, during the granulation in this embodiment is removed. It is therefore particularly preferred to adjust the portion of the liquid phase in the raw material dispersion so that 40-70% fertilizer granules form from the raw material dispersion, very particularly preferably 45-60%. In the context of the present invention, the formation of 40-70% fertilizer granules from the raw material dispersion corresponds to a solids content in a range from 40 to 70% or between 40 and 70%. With such a portion of the liquid phase, a raw material dispersion can advantageously be set to be sufficiently stable and pumpable, the energy expenditure for the separation of the liquid phase being rated as acceptable, in particular in comparison to conventional methods which are known from the prior art. The raw material dispersion can be produced in a stirred tank or mixer. The advantage of this preferred embodiment for granulation is that the granule size can be adjusted particularly well, the granules are very homogeneous and a particularly round and compact granule shape is achieved. The granules obtained are particularly easy to handle and particularly easy to apply to fields, for example with spreading devices. Due to the compactness of the granules, little dust and abrasion arises, which is also advantageous for spreading, for example scattering devices.

It is preferred in the sense of the invention that fertilizer granules have a low moisture content, i.e. physically bound water. In particular, it is preferred that moisture is in a range of less than 5%, preferably less than 2%. Depending on the type of granulation, such a moisture range can already be achieved during the granulation, in particular with spray agglomeration or granulation in which the granulation and/or drying take place largely simultaneously. In the sense of the invention it can be preferred that the granules produced are dried after the granulation and/or extrusion or at least additionally post-dried.

Various drying technologies are available for this, for example contact dryers in which the thermal energy required for drying is preferably supplied by contact with heating surfaces, convective dryers in which the thermal energy required for drying is preferably supplied by contact with hot gas or radiation dryers, in which the thermal energy required for drying is preferably supplied by radiation with a defined frequency. The existing liquid phase, for example the water, is separated to the required extent by drying. The drying also preferably increases the strength of the granules, for example in that binding phases form as a result of the drying or, for example, in that a binder thereby forms its binding effect. In an advantageous embodiment of the invention, the drying is carried out by the natural heat of the granules produced or is at least supported thereby. The natural heat, the granules are preferably obtained by heating, for example, a heating of the granules process-related by the granulation and/or the extrusion process or by chemical reaction. If the granules are heated by the granulation and/or extrusion process, it is preferred in the sense of the invention that the heating is carried out by introducing mechanical energy, the mechanical energy preferably being converted into thermal energy. For example, the reaction between CaO and acid and/or water or the reaction between sulfuric acid and water, especially when diluted, provide exothermic energy which can preferably be used to heat the raw material dispersion and/or the shaped granules. If crystallization products from phosphorus elimination, such as struvite, brushite and/or hydroxyapatite-like Ca—P phase, are added to the raw material mixture and are consequently contained in the granules or green granules produced, it is preferred in the sense of the invention that the drying in a preferred embodiment of the Invention above 100° C. based on the material temperature during drying.

These crystallization products preferably contain a large proportion of chemically bound water, which is preferably not "moisture" in the context of the invention, but water, which is present in the crystal structure. In the range above 100° C., this chemically bound surface water is preferably split off. By separating the water from the granulate, the percentage of the remaining components advantageously increases.

For example, the concentration of nutrients in the granulate can be increased, which was previously quasi diluted by the chemically bound water. In a particularly preferred embodiment of the invention, the drying takes place when crystallization products from the phosphorus removal are present in a range of 100-140° C. based on the material temperature during the drying.

For the purposes of the invention, it is therefore particularly preferred for the drying to take place in a temperature range between 100 and 140° C. Above 140° C. there is a risk that nitrogen will increasingly be split off. This is associated with an undesirable loss of nitrogen from the granules. In addition, the exhaust air must be cleaned accordingly more complex. By limiting the temperature to max. 140° C. in this preferred embodiment of the invention, these disadvantages can be largely avoided. In a very special embodiment of the invention, drying takes place in a temperature range between 120° C. and 140° C.

In the sense of the invention, it is preferred that the fertilizer granules can be produced as precisely as possible. A size of the granules which is as uniform as possible advantageously ensures defined, uniform disintegration properties, which is necessary for a targeted supply of nutrients. Since, in addition, the presence of oversize and undersize can affect the mechanical application of the fertilizer, it is preferred in the sense of the invention that oversize and undersize are separated from the undersize and, if appropriate, the production process, in particular the mixing and/or granulation process, possibly with a previous one Processing and/or grinding, can be recycled.

For the purposes of the invention, the term "good grain" preferably describes a granulate in a desired size range for the granulate grains. For the purposes of the invention, the terms "oversize" and "undersize" preferably describe those granules which—preferably significantly—have larger or smaller diameters than the good grain. Moreover, it is preferred for the purposes of the invention that the granules have a good bond within the granules, in order to avoid dust losses when the fertilizer is applied, even after prolonged storage. The strength of the granules can be adjusted, for example, via the process control. For example, the drying rate has an influence on the porosity and compactness and thus on the strength of the granules and can be influenced. The strength can also be influenced, for example, by the type and fineness of the raw material components or increased by adding binders.

The fertilizer granules produced according to the invention can be given one or more coatings for functionalization (e.g. reducing the tendency to clump, increasing the strength), for protection (e.g. against moisture) and/or for controlled release of nutrients (influencing the solubility by the coating). Numerous methods and technologies for coating are known to the person skilled in the art, all methods and technologies which produce a desired coating with the desired functionality being suitable.

In process step d) of the proposed method, the liquid phase which is at least partially separated in process step b) is returned to process step a) for the production of a raw material dispersion or c) for granulation, wherein an at least partial heavy metal separation can optionally take place. Whether and to what extent heavy metals have to be separated depends, for example, on the heavy metal contamination of the raw materials used, the legal requirements and the desired sustainability of the products produced. Such conditioning can include, in particular, those measures that enable, improve and/or favor the heavy metal separation in process step d), for example a targeted adjustment of the pH value, the precipitation or separation of disruptive accompanying and/or nutrient elements or adjustments a defined concentration, viscosity and/or temperature.

Various methods are available for the possible separation of the heavy metal ions from the partially separated liquid phase, for example by means of an ion exchanger, liquid-liquid separation, activated carbon, bacteria, fungi, algae, a biomass from bacteria, fungi or algae, a precipitant, through nano filters and/or electrolytically. Depending on the composition and conditioning of the liquid phase, the methods for separating heavy metals are suitable in different ways and are preferably selected accordingly. The process used is also selected according to which type of heavy metals and in which concentration is to be separated. This can be measured, for example, by what undesirable types of heavy metals are present in the inorganic secondary phosphate and how much of them should be removed. The selected heavy metals also do not have to be completely separated off, if necessary a partial separation is sufficient to obtain the desired heavy metal concentration in the fertilizer granulate produced, for example below the limit values of the valid fertilizer regulation.

The type of possible heavy metal deposition is also selected according to whether and if so which other dissolved components the liquid phase contains in addition to the heavy metals. Thus, the separated liquid phase from process step b) can contain, in addition to the dissolved heavy metals, other dissolved substances, for example a considerable proportion of phosphate, which for example was also dissolved from the inorganic secondary phosphate by the reactant. In this case, it is preferred in the sense of the invention that the heavy metal deposition is preferably carried out selectively.

In the sense of the invention, this means that the heavy metals to be separated are in particular selectively separated by the separation method used. The dissolved components also contained therein, for example contained nutrients such as phosphate, should essentially remain completely in the liquid phase until after the heavy metal has been separated off. It is therefore advantageous if the pH value for this case in process step b) and for heavy metal separation is less than 1.8, since this ensures that the dissolved heavy metals and/or the nutrients remain in solution. Alternatively, complexing agents can be added before the heavy metal is separated in such a way that precipitation of the phosphate is largely prevented in a pH range greater than 1.8.

The preferred selective, at least partial separation of the heavy metals from nutrient-containing, strongly acidic solutions can be carried out in a preferred embodiment of the invention by means of ion exchangers. For the purposes of the invention, ion exchangers are preferably those materials with which dissolved ions can be replaced by other ions of the same type. For this purpose, the liquid phase separated in process step b) is preferably flowed through one or more times, for example in columns which are filled with an ion exchange material, or membranes. The ions to be exchanged are preferably bound to the ion exchange material, which in turn releases an equivalent amount of previously bound ions into the solution.

When the ion exchanger is exhausted and essentially completely saturated, it can be regenerated, for example.

It is preferred in the sense of the invention that the ion exchangers are set up to remove the disruptive heavy metals as selectively as possible, but not the phosphate.

Also, the ion exchangers should preferably not remove any other cations, such as alkali or alkaline earth metals, since otherwise the service life is significantly reduced. By specifically selecting the type and amount of ion exchanger, the process control and setting or conditioning of the separated solution, heavy metals can be removed particularly effectively.

In another preferred embodiment for largely selective heavy metal separation, a sacrificial metal is added to the separated liquid phase. For the purposes of the invention, a sacrificial metal is preferably a less noble metal than the heavy metals to be separated, for example selected from the group consisting of aluminum, iron and zinc or mixtures thereof. If the sacrificial metal comes into contact with the dissolved heavy metals, there is advantageously a reduction in the dissolved noble metals on the surface of the less noble sacrificial metal, which is oxidized in the process. The running reductive conditions can be enhanced by the addition of a suitable reducing agent. The sacrificial metal is preferably added in a stoichiometric excess of 1 to 5 times the molar amount of the noble metals to be separated and the reaction with the sacrificial metal preferably lasts 10 to 60 minutes.

The sacrificial metal is in particular added to the separated liquid phase and the metallically deposited heavy metal mixture of, for example, cadmium, copper and/or lead can subsequently be separated off, for example by filtration.

In another preferred embodiment of the invention, the selective heavy metal separation is carried out by hydroxide precipitation by raising the pH. In this embodiment, it is preferred that complexing agents prevent the phosphate from precipitating in the adjusted pH range In another preferred embodiment of the invention, the selective heavy metal separation takes place by sulfide precipitation by adding, for example, $H_2S$, $CH_4N_2S$, $Na_2S$. For the purposes of the invention, it is preferred that the pH value range be raised above 1.8 if the precipitation of the phosphate is prevented by complexing agents.

If the separated liquid phase from process step b) no longer contains any relevant nutrient components, in particular no relevant amount of dissolved phosphate, other methods for heavy metal separation can also be used. Depending on the type of reactant, for example, the majority of the phosphate dissolved by the reaction agent can be increased to a range from 1.5 to 3.5, preferably from 1.5 to 3, particularly preferably from by increasing the pH Range 1.5 to 2.5, for example, be precipitated as aluminum phosphate, the relevant heavy metals, such as lead, cadmium, nickel, chromium or copper, being largely further dissolved in the preferred pH value ranges.

In particular, a pH range between 1.5 to 3.5 is preferred, in particular between 1.5 to 3 and very particularly preferably between 1.5 and 2.5. For example, hydrochloric acid and/or nitric acid can be used as the reactant. The pH increase in this range can take place in process step a) or b) before the partial separation of the liquid phase, for example by adding alkalis or hydroxides. As a result, the liquid phase partially separated in process step b) advantageously contains significantly less dissolved phosphate. The remaining residues can be separated off together with the heavy metals without any significant economic losses. This significantly simplifies heavy metal separation. In this case, for example, the heavy metals can be precipitated by increasing the pH, for example in the range 5 to 7, and then separated off. In other words, it is preferred that in this case the pH is increased in a range between 5 and 7. In principle, the liquid phase, which has been partially or completely cleaned of the heavy metals, can be disposed of in whole or in part, or it can be recycled. It is preferred in the sense of the invention that the liquid phase separated in process step b) is at least partially fed to process step a) and/or process step c). In process step a), the liquid phase is used in particular to adjust the solid-liquid ratio. In process step c), the liquid phase can be used for granulation or for adjusting the raw material dispersion for the granulation. In a preferred embodiment of the invention, the liquid phase which has been separated off in process step b) and partially cleaned or not cleaned of the heavy metals is at least partly returned to process step a). Before or during the return to process step a), the required reactant (s) are at least partially fed to the liquid phase and thus the liquid phase is transferred together with at least the proportionate reactant in process step a). If the reaction agent or agents are, for example, acids, the addition of the reaction agent can advantageously lower the pH and thus reduce the precipitation or crystallization of dissolved components from the liquid phase until they are returned to process step a).

The invention is described in more detail using the following exemplary embodiment. Examples 1 and 2 show examples not according to the invention, which are intended to illustrate the shortcomings and disadvantages of the prior art. The exemplary embodiments 3 to 6 show exemplary embodiments according to the present invention. Further advantages, features and details of the invention can be gathered from the further subclaims and the description below. Features mentioned there can be essential to the invention individually or in any combination. Thus, the disclosure of the individual aspects of the invention can always be referred to mutually.

Example 1 (not According to the Invention, to Illustrate the State of the Art)

In a ploughshare mixer with a knife set, 100 kg of sewage sludge ash ($P_2O_5$ content 21.0%, of which 38% neutral ammonium citrate soluble and <1% water soluble; heavy metal contents of 178 mg/kg, Pb; 75 mg/kg, Ni 18.3 mg/kg, and Cd 110 kg of phosphoric acid (84%) are mixed, whereby the ash reacts with the acid and the mixture is to be processed into granules in a defined grain size range of 2.5-4 mm.

However, this is only possible with considerable difficulty. The problem is the violent reaction between ash and acid, which leads to incrustation, deposits and blockages. The mass of ash and acid produced is very tough and sticky and therefore very difficult to handle. In addition, the acid mixture corrodes the mixer used. The granules produced have an inhomogeneous particle size distribution in lump form with comparatively low strength. The total $P_2O_5$ content is 46%, of which 82% is ammonium citrate-soluble and 61% water-soluble. The heavy metals, introduced by the sewage sludge ash, are disadvantageously not separated in this example.

Example 2 (not According to the Invention, to Illustrate the State of the Art)

140 kg of water and 110 kg of phosphoric acid (85%) are placed in a mixing vessel and mixed, and 100 kg of sewage sludge ash ($P_2O_5$ content 21.0%, of which 38% neutral ammonium citrate and <1% water soluble; (heavy metal content of 178 mg/kg Pb; 75 mg/kg Ni and 18.3 mg/kg Cd) were added and the raw material dispersion thus produced was mixed. The solids content of the raw material dispersion produced in this way is approximately 55%. A significantly higher proportion of solids is hardly feasible in industrial operation, since this increases the viscosity significantly, sometimes only in the course of the reaction between acid and ash. High viscosity complicates or prevents stirring, pumping and pumping and harbors the risk of blockages and incrustations.

After the components have been brought together, an incubation time of 25 minutes is maintained, during which time stirring is continued. For the purposes of the invention, the formulation that the "incubation time is observed" preferably means that the components can react with one another before a new process step is initiated or before new reaction partners are added to the mixture. Due to the reaction between acid and sewage sludge, the raw material dispersion heats up to approx. 40° C. Due to the action of the acid on the sewage sludge ash and the resulting pH value of approx. 0.5, phosphate, heavy metals and other substances are dissolved after the incubation period.

The raw material dispersion produced in this way is then completely granulated. Only a few granulation processes are available for the complete granulation of a raw material dispersion with a solids content of 55%. Inexpensive processes, such as granulation on the granulation plate or in the intensive mixer, are not possible due to the high proportion of liquid phase. Spray granulation is possible, for example.

For this purpose, in this example, the raw material dispersion produced is fed to a continuous fluidized bed system for spray granulation. The spray granulation is controlled so that an average granule size of 3.5 mm is obtained. After the spray granulation, granules having a granule diameter of less than 2 mm and granules having a granule diameter of greater than 5 mm are separated by sieving and fed to the spray granulation process as core material, the granules having been ground more than 5 mm beforehand. The granules produced have a round and compact granular form in a range between 2-5 mm, a total $P_2O_5$ content of 46%, of which 92% ammonium citrate are soluble and 72% water-soluble.

The advantage of this embodiment compared to example 1 is that the reaction between ash and acid takes place in the raw material dispersion produced and is therefore controllable. The largely reacted raw material dispersion hardly contains any free acid, so that significantly fewer corrosion problems occur during further processing. The advantages of granulation using spray granulation in this example are that raw material dispersions with a high proportion of liquid phase can be granulated and very compact, abrasion-resistant and spherical granules are formed.

A major disadvantage, however, is that the energy consumption due to drying the high proportion of liquid phase, by producing a fluidized bed and by the necessary atomizing energy is very high.

Another disadvantage of this production process is that the heavy metals, which are contained in the sewage sludge ash, for example, are not separated but are completely transferred to the fertilizer granulate. In example 2, approx. 52% of the components of the sewage sludge ash used are contained, which is why a heavy metal concentration for lead of 92 mg/kg, for nickel 39 mg/kg and for cadmium 10 mg/kg results from the entry with the sewage sludge ash in the fertilizer produced. granules results Example 3 (According to the Invention)

Analogous to example 2, a raw material dispersion consisting of 140 kg water, 110 kg phosphoric acid (85%) and 100 kg sewage sludge ash ($P_2O_5$ content 21.0%, of which 38% neutral ammonium citrate and <1% water soluble; heavy metal content of 178 mg/kg Pb; 75 mg/kg Ni, and 18.3 mg/kg Cd) and an incubation period of 25 minutes was observed. After the incubation period, the raw material dispersion thus produced is fed to a solid-liquid separation. A large part of the liquid phase is separated from the undissolved solid by means of a filter press in such a way that an earth-moist solid mixture with a moisture content of less than 20% is preferably formed.

The separated and also nutrient-containing solution is returned to the process of the raw material dispersion preparation for the next batch and, preferably in an equivalent amount, replaces the water content mentioned above in the recipe of the raw material dispersion. With continuously ongoing process control, an equilibrium cycle of the dissolved substances is established in this sub-cycle. Accordingly, after this equilibrium has been set, the phosphate in the amount added will pass through the sewage sludge ash for granulation and thus into the granulate as desired.

The earth-moist solid mixture resulting from the solid-liquid separation is transferred to an intensive mixer (Eirich R16W) and mixed intensively there. The ratio of solid to liquid phase in the intensive mixer is preferably adjusted by adding water or a powder (e.g. sewage sludge ash) so that green granules of the desired size form during intensive mixing. The green granules formed are then dried at 110° C. and fractionated into granules with diameters in a range between 2 and 5 mm. The fraction of granules with a diameter of less than 2 mm and the fraction of granules with a diameter of more than 5 mm are returned after the granulation has been ground beforehand. After setting the equilibrium cycles described above, the granules produced advantageously have a round and compact granulate shape in the range 2-5 mm, a total $P_2O_5$ content of 46%, of which 93% are ammonium citrate-soluble and 61% water-soluble. The fertilizer granulate contains approx. 52% components of the sewage sludge ash used, which is why a heavy metal concentration for lead of 92 mg/kg, for nickel 39 mg/kg and for cadmium 10 mg/kg due to the entry with the sewage sludge ash in the fertilizer granulate produced results.

The advantage of this embodiment compared to example 1 is that the reaction between ash and acid takes place in the raw material dispersion produced, so that it can be controlled and hardly any corrosion problems occur due to the low amount of free acid.

A significant advantage over Example 2 is that part of the liquid phase is mechanically separated from the raw material dispersion. This means that significantly less water has to be evaporated, which saves considerable energy costs and thus makes the process significantly more economical.

Example 4 (According to the Invention)

This embodiment substantially corresponds to Example 3 with the following change:

The separated liquid phase from the solid-liquid separation is not fed directly to the renewed production of a raw material dispersion, but rather to the partial heavy metal separation. In this embodiment of the invention, the heavy metals are partially separated off by means of ion exchangers at a pH of the solution of approximately 0.5. For this purpose, the separated liquid phase is fed to a column which, for example, comprises the Lewatit MonoPlus TP220 ion exchange resin. The separated liquid flows through the container with the ion exchange resin within 30 minutes, the ion exchange resin selectively taking up ions from the solution. In particular, Cd, Cu, Pb and Zn are each deposited with more than 70% of the amount contained, with dissolved phosphate advantageously being separated off only to a small extent. If the ion exchanger is loaded, it can advantageously be regenerated and the resulting heavy metal-containing regeneration solution can be treated or disposed of. The solution thus purified, which is low in heavy metals but still contains nutrients, is only subsequently returned to the process of producing the raw material dispersion for the next batch and, preferably in an equivalent amount, replaces the water content mentioned above in the recipe for the raw material dispersion analogously to exemplary embodiment 3.

As a result of this possible change in the course of the process, the granules produced after the adjustment of the equilibrium circuits described above also have a round and compact granulate shape with granules with a diameter in a range of 2-5 mm, a total $P_2O_5$ content of 46%, of which 93% soluble in ammonium citrate and 61% in water, but heavy metals are advantageously partially removed. Correspondingly, fewer heavy metals (50 mg/kg lead, for 24 mg/kg nickel and for cadmium 6 mg/kg) are detected in the fertilizer granulate produced.

Embodiment 4 has the same advantages as Embodiment 3. An additional advantage is that some of the heavy metals are separated off here, and the heavy metal content in the fertilizer produced can thus advantageously be reduced.

Example 5 (According to the Invention)

200 kg of water and 40 kg of nitric acid (65%) are introduced and mixed in a mixing container as a reactant, for this purpose 100 kg of sewage sludge ash as an inorganic secondary phosphate ($P_2O_5$ content 21.0%, of which 38% neutral ammonium citrate and <1% water soluble); heavy metal contents of 178 mg/kg Pb; 75 mg/kg Ni and 18.3 mg/kg Cd were added and the raw material dispersion thus produced was mixed. After the components have been brought together, an incubation time of 25 minutes is maintained, during which time stirring is continued. The reaction between the reactant and the secondary phosphate causes the raw material dispersion to heat up to approx. 40° C. Due to the action of the reaction agent on the sewage sludge ash and the resulting pH value of approx. 0.5, phosphate, heavy metals and other substances are partially dissolved after the incubation period.

After the incubation period, 500 kg of the liquid phase from the heavy metal separation process step, which is at least partially cleaned of the heavy metals but still contains nutrients, are fed to the raw material dispersion. Since this liquid phase is not present at the start of the process, preferably a solution of water and nitric acid with a pH of approximately 0.5 can preferably be used first. The dissolved heavy metals are diluted by supplying the liquid phase, but the heavy metals preferably remain largely dissolved. This so diluted raw material dispersion is fed to a filter and 500 kg of liquid phase are separated from the raw material dispersion there. A new mixture can begin in the emptied mixing container analogously to the description above for an ongoing process.

The separated liquid phase is fed to the partial heavy metal separation. The heavy metals are partially separated by adding a sacrificial metal. For this purpose, 5 kg of fine aluminum powder is added to the 500 kg of separated liquid phase in a mixing container and mixed intensively. After 30 minutes of exposure with constant stirring, the solid particles are filtered out of the liquid phase. In the sense of the invention, it is preferred to use the terms "exposure time" and "incubation time" synonymously.

The solution, which is cleaned in such a way that it is low in heavy metals but still contains nutrients, is added to the raw material dispersion after the incubation period. Any liquid losses are compensated for by water, for example. This serves to dilute the dissolved heavy metals, but also to return the dissolved nutrients. With continuously ongoing process control, an equilibrium cycle of the dissolved nutrients is established in this sub-cycle of heavy metal separation.

The raw material dispersion with reduced liquid phase remaining from the separation of the liquid phase described above is pumped into a storage container and initially stirred further there. 120 kg of monoammonium phosphate (59% $P_2O_5$, 11.5% N) are added with stirring. The raw material dispersion is fed to a continuous fluid bed system for spray granulation. The spray granulation is controlled in such a way that an average granule size of 3.5 mm is obtained. After the spray granulation, granules with a granule grain diameter of less than 2 mm and granules with a granule grain diameter of more than 5 mm are separated by sieving and fed to the spray granulation process as core material, the granules having a granule grain diameter of more than 5 mm being ground beforehand. For spray granulation, a core material in the form of a fluidized bed is required, onto which the raw material dispersion is sprayed. For this purpose, in the start-up phase the core material of the species is preferably presented, in the continuous process the core material results from the recycling of the separated granulate fractions. For a continuously ongoing process, buffer tanks are installed during the heavy metal separation and granulation process steps to ensure the chronological sequence of the parallel continuous and discontinuous process steps.

After setting the equilibrium weight cycles described above, the granules produced have a round and compact granulate shape with a granule diameter in a range of 2-5 mm, a total $P_2O_5$ content of 38%, of which 92% are ammonium citrate-soluble and 61% water-soluble. Approx. 41% of the sewage sludge ash components are contained in the fertilizer granulate. Without separation of heavy metals, this would result in a concentration for lead of 73 mg/kg, for nickel 31 mg/kg, and for cadmium 7 mg/kg through the entry with the sewage sludge ash. In contrast, 21 mg/kg were determined for lead, 6 mg/kg for nickel, and 2 mg/kg for cadmium. The heavy metal separation thus advantageously removes more than 50% of the heavy metals Ni, Pb and Cd which are introduced with the ash.

Example 6 (According to the Invention)

50 kg of water and 40 kg of nitric acid (65%) are introduced and mixed in a mixing container as a reagent. For this purpose 100 kg of sewage sludge ash as an inorganic secondary phosphate ($P_2O_5$ content 21.0%, of which 38% neutral ammonium citrate and <1% water soluble); heavy metal contents of 178 mg/kg Pb; 75 mg/kg Ni, and 18.3 mg/kg Cd) were added and the raw material dispersion thus produced was mixed.

After the components have been combined, an incubation time of 25 minutes is maintained, during which time stirring is continued. Due to the action of the reactant on the sewage sludge ash and the resulting pH value of approximately 0.5, phosphate, heavy metals and other substances are partially dissolved after the incubation period. After the incubation period, the raw material dispersion is fed analogously to exemplary embodiment 5,500 kg of the liquid phase at least partially cleaned of the heavy metals but still containing nutrients from the process step of heavy metal separation.

Subsequently, in contrast to example 5, the pH of this raw material dispersion is then adjusted to 2 by sodium hydroxide solution with stirring. As a result, most of the previously dissolved phosphate precipitates, whereas the dissolved heavy metals such as lead, nickel and cadmium remain largely dissolved. This raw material dispersion conditioned in this way is fed to a filter, where 500 kg of liquid phase are separated from the raw material dispersion. A new mixture can begin in the emptied mixing container for a continuous process analogous to the description above. An essential difference from embodiment 5 is that the separated phase contains the dissolved heavy metals, but largely does not contain any dissolved phosphate. In contrast to exemplary embodiment 5, the partial heavy metal deposition in exemplary embodiment 6 is preferably not carried out using sacrificial metal, but rather by selective precipitation of the heavy metals by raising the pH value. For this purpose, the separated liquid phase with the adjusted pH of 2 is fed into a vessel and the pH is adjusted to 5 there and stirred for about 30 minutes. The major part of the dissolved heavy metals precipitates and is filtered out accordingly after the precipitation. The filtrate is now low in heavy metals and is recycled analogously to embodiment 5 of the raw material dispersion before the partial separation of the liquid phase in the circulation. The raw material dispersion with reduced liquid phase remaining from the separation of the liquid phase has a significantly smaller proportion of non-separated liquid phase than embodiment 5, so the solids content is significantly higher and is transferred to an intensive mixer from Eirich. In addition, 20 kg of elemental sulfur as fine powder, 40 kg of urea and 240 kg of struvite, which was preferably ground to fineness of powder beforehand, are added and everything is mixed intensively in an intensive mixer (Eirich R16W). This forms green granules, which are then dried at 110° C. and fractionated into granules with a diameter in a range of 2-5 mm. The fraction with a granule diameter of less than 2 mm and the fraction with a granule diameter of greater than 5 mm are returned after the granulation has been ground beforehand.

The entire process is repeated continuously, for which purpose appropriate buffer tanks are integrated in the process steps of heavy metal separation and granulation in order to ensure the chronological sequence of the continuous and discontinuous process steps running in parallel.

After the above-described equilibrium cycles have been set, the granules produced have a total $P_2O_5$ content of 27%, 97% of which are soluble in ammonium citrate and 18% in water, an N content of 12% and an S content of 6.5%. Approx. 32% of the sewage sludge ash used is contained in the fertilizer granulate produced. Without heavy metal separation, this would result in a concentration of 57 mg/kg for lead, 24 mg/kg for nickel, and 6 mg/kg for cadmium. In contrast, lead weights of 16 mg/kg, nickel 5 mg/kg, and cadmium 2 mg/kg were determined. The heavy metal separation means that more than 50% of the heavy metals that are deposited with the ash are separated.

Figure 2:
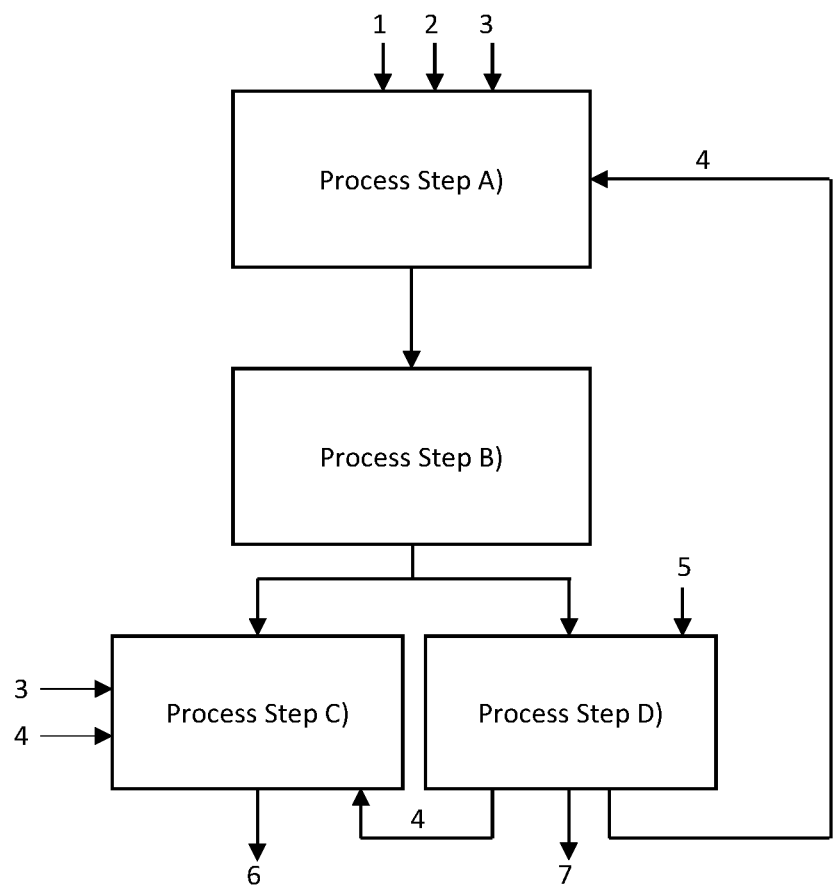

The invention is described in more detail with reference to the following figures: FIGS. 1 and 2 each show a schematic representation of preferred embodiments of the proposed method in two embodiments.

FIG. 1 describes a preferred embodiment of the proposed method without the optional separation of heavy metals. The preferred embodiment of the proposed method shown in FIG. 1 is preferably referred to as the "basic embodiment" of the method. The basic embodiment essentially makes full use of the procedural advantages of producing the raw material dispersion according to the invention with a high proportion of liquid phase. In contrast to methods from the prior art, a raw material dispersion with a high liquid phase content is first produced, the high liquid phase content advantageously acting as a buffer for the reaction taking place. As a result, the reactions which often occur spontaneously and are sometimes very exothermic when the phosphate-containing secondary raw material is mixed with the mineral acid can be checked and controlled, and the mixture does not show any troublesome stickiness. Only after the reaction between the inorganic secondary phosphate (1) and the reactant (2) has been largely carried out does the further processing to the granulate take place. The reaction of the phosphate conversion is thus advantageously separated from the process of granulation.

The proposed course of the reaction between inorganic secondary phosphate (1) and reactant (2) in a raw material dispersion with a high proportion of liquid phase has the process engineering advantages described in particular. If the raw material dispersion is to be granulated directly, a very high proportion of water has to be removed by, for example, drying, which is, however, cost-intensive. Accordingly, in the proposed method, part of the liquid phase is circulated and mechanically separated before the granulation and fed back to the manufacture of the raw material dispersion.

In process step a), a raw material dispersion is generated from at least one inorganic secondary phosphate (1) and at least one reactant (2). For the sufficient reaction between the at least one reactant (2) and the at least one inorganic secondary phosphate (1), an incubation period is awaited, in which case the raw material dispersion can be mixed further. It is provided that the reactant (2) reacts at least with parts of the phosphate introduced by the inorganic secondary phosphate (1) in order to increase the solubility and plant availability of this phosphate. In process step a), additional components (3), such as, for example, nutrient-containing components, dispersing and defoaming agents, structural materials, agents for pH adjustment, urease inhibitors, ammonium stabilizers and/or water, can be added to the raw material dispersion. The liquid phase (4) at least partially cleaned of heavy metals in process step d) can also be supplied and used, for example, to adjust the solid-liquid ratio.

In process step b), part of the liquid phase is separated from the raw material dispersion produced in process step a) and process step d) is added. The remaining residue from the solid or undissolved portion of the raw material suspension with the remaining portion of the liquid phase, which is preferably not separated off, is fed to process step c).

In process step c), the granulation and/or extrusion of the remaining raw material dispersion takes place with reduced liquid phase from process step b). Depending on the liquid-solid ratio set, different granulation or extrusion processes can be used. Before and/or during the granulation, further components (3) and/or low-heavy metal liquid phase from process step d) can be added. This process step c) results in soil- and plant-specific fertilizer granules (6) with an adjusted and constant nutrient composition, whereby inorganic secondary phosphate, such as sewage sludge ash, can be used at least as a nutrient source, the phosphate contained therein being made particularly readily available to plants by the action of the reactant and the heavy metals contained in the inorganic secondary phosphate are at least partially separated off.

In process step d), the liquid phase (4) is recycled to produce a raw material dispersion analogous to process step a).

Process steps a) to d) are repeated as often as desired, which is preferably referred to as process step e).

FIG. 2 shows a preferred embodiment of the proposed method comprising an at least partial separation of the heavy metals. In contrast to the preferred embodiment of the method shown in FIG. 1, in process step a) the reactant (2) is not only reacted at least with parts of the phosphate introduced by the inorganic secondary phosphate (1), but also the reactant (2) extract the highest possible proportion of heavy metals from the inorganic secondary phosphate (1).

Process steps b) and c) are essentially comparable to the embodiment of the invention shown in FIG. 1. In process step d), however, heavy metals (7) are at least partially separated from the liquid phase separated in process step b) and these heavy metals (7) are removed from the process, the low-heavy metal liquid phase (4) subsequently being used to produce one Raw material dispersion analogous to process step a) and/or can be returned to process step c). Different methods can be used to separate the heavy metals, depending on the type and concentration of the heavy metals to be separated or the conditioning of the separated liquid phase from process step b). Depending on the type of separation process, additives for separating heavy metals (5), such as precipitants and flocculants, pH adjustment agents, sacrificial metals and/or extraction agents are used. Process steps a) to d) can be repeated any number of times

LIST OF REFERENCE NUMBERS 1 inorganic secondary phosphate
2 reactants
3 other components
4 liquid phase
5 heavy metal separation
6 fertilizer granules
7 heavy metals

The invention claimed is:

1. A method for producing a pedosphere-improving granulate (6) comprising:
   a) production of a raw material dispersion comprising at least one inorganic secondary phosphate (1) and at least one reactant (2), the proportion of a liquid phase (4) in the raw material dispersion being greater than 30%, with an incubation time between inorganic secondary phosphate (1) and reactant (2) between 1 to 100 minutes, the secondary phosphate being an incineration ash or a mixture of several incineration ashes comprising heavy metals (7) of at least one of lead, cadmium, nickel, chromium or copper and having a phosphorous content greater than 5% $P_2O_5$ and a total organic carbon content of less than 3%,
   b) separation of part of the liquid phase (4) of the raw material dispersion,
   c) granulation, extrusion, or a combination thereof of the remaining raw material dispersion with reduced liquid phase (4),
   d) either recycling the liquid phase (4) separated in process step b) without at least partially separating heavy metal (5) into process step a) to produce a raw material dispersion or at least partially separating heavy metals (7) from the liquid phase (4) separated in process step b) and discharging these heavy metals (7) from the process with subsequent recycling of the low-heavy metal liquid phase (4) to produce a raw material dispersion analogous to process step a) and/or in process step c) and
   e) repeating the process steps a) to d).

2. The method according to claim 1, characterized in that
the raw material dispersion before the partial separation of the liquid phase (4) is adjusted so that the solids content is less than 50%.

3. The method according to claim 1, characterized in that
a pH of the raw material dispersion produced before the partial separation of the liquid phase (4) is in a range between 1.5 to 3.5.

4. The method according to claim 1, characterized in that
the at least partial separation of heavy metals (7) from the liquid phase (4) are present and separated in process step b) is carried out by one or more precipitation reactions and subsequent separation of the precipitation products.

5. The method according to claim 1, characterized in that
the at least partial separation of heavy metals (7) from the in the process step b) separated liquid phase is carried out by one or more selective separation processes.

6. The method according to claim 1, characterized in that
the raw material dispersion with reduced liquid phase (4) from process step b) has a moisture content between 10 and 40%.

7. The method according to claim 1, characterized in that
a pH of the raw material dispersion with reduced liquid phase (4) is in a range of 4-8.

8. The method according to claim 1, characterized in that
the liquid phase (4) separated in process step b) is fed to an at least partial heavy metal separation (5),
the separated liquid phase (4), which has been at least partially cleaned of the heavy metals (7), is then fed into process step a) for the production of a raw material suspension, the reactant (2) being present before or during the return to process step a) can be supplied at least partially to this liquid phase (4),
the raw material dispersion with reduced liquid phase (4) after process step b) has a solids content of 40% to 70% and
the raw material dispersion is fed to a granulation with reduced liquid phase (4).

9. The method of claim 1, characterized in that
the granulation is followed by a fractionation of the nutrient granules (6) produced, a coarse fraction and/or a fine fraction being ground and at least partially feedable to step a), b), c), or a combination thereof.

10. The method of claim 1, characterized in that
a total of 1 to 70% crystallization products from a phosphorus elimination of step a), b), c), or a combination thereof is supplied.

11. The method of claim 1, characterized in that the method further comprises drying taking place above 100° C.

* * * * *